United States Patent
Alshina et al.

(10) Patent No.: US 9,438,921 B2
(45) Date of Patent: *Sep. 6, 2016

(54) VIDEO ENCODING METHOD USING OFFSET ADJUSTMENTS ACCORDING TO PIXEL CLASSIFICATION AND APPARATUS THEREFOR, VIDEO DECODING METHOD AND APPARATUS THEREFOR

(71) Applicant: SAMSUNG ELECTRONICS CO., LTD., Suwon-si (KR)

(72) Inventors: Elena Alshina, Suwon-si (KR); Alexander Alshin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,020

(22) Filed: Jan. 22, 2015

(65) Prior Publication Data
US 2015/0131742 A1    May 14, 2015

Related U.S. Application Data

(63) Continuation of application No. 14/130,011, filed as application No. PCT/KR2012/005086 on Jun. 27, 2012.

(60) Provisional application No. 61/502,018, filed on Jun. 28, 2011.

(51) Int. Cl.
*H04N 19/14* (2014.01)
*H04N 19/50* (2014.01)
(Continued)

(52) U.S. Cl.
CPC ............ *H04N 19/44* (2014.11); *G06T 5/001* (2013.01); *H04N 19/117* (2014.11);
(Continued)

(58) Field of Classification Search
CPC ........... H04N 19/00569; H04N 19/50; H04N 19/117; H04N 19/463; H04N 19/186; H04N 19/182; H04N 19/85; H04N 19/14
USPC .......................... 375/240.24, 240.02, 240.29
See application file for complete search history.

(56) References Cited

U.S. PATENT DOCUMENTS

| | | |
|---|---|---|
| 4,661,862 A | 4/1987 | Thompson |
| 6,043,838 A | 3/2000 | Chen |

(Continued)

FOREIGN PATENT DOCUMENTS

| | | |
|---|---|---|
| CN | 1418436 A | 5/2003 |
| CN | 101926175 A | 12/2010 |

(Continued)

OTHER PUBLICATIONS

Fu, et al.; "CE13: Sample Adaptive Offset with LCU-Independent Decoding", Joint Collaborative Team on Video Coding (JCT-VC) of ITU-T SG16 WP3 and ISO/IEC/JTC1/SC29/WG11, Mar. 2011, 7 pages total.

(Continued)

*Primary Examiner* — Christopher S Kelley
*Assistant Examiner* — Zhihan Zhou
(74) *Attorney, Agent, or Firm* — Sughrue Mion, PLLC

(57) ABSTRACT

A video encoding method and apparatus and video decoding method and apparatus generate a restored image having a minimum error with respect to an original image based on offset merge information indicating whether offset parameters of a current block and at least one neighboring block from among blocks of video are identical.

3 Claims, 14 Drawing Sheets

(51) Int. Cl.

| | | |
|---|---|---|
| H04N 19/44 | (2014.01) | |
| H04N 19/117 | (2014.01) | |
| H04N 19/186 | (2014.01) | |
| H04N 19/182 | (2014.01) | |
| H04N 19/85 | (2014.01) | |
| H04N 19/463 | (2014.01) | |
| H04N 19/176 | (2014.01) | |
| H04N 19/137 | (2014.01) | |
| H04N 19/89 | (2014.01) | |
| H04N 19/90 | (2014.01) | |
| G06T 5/00 | (2006.01) | |
| H04N 19/189 | (2014.01) | |
| H04N 19/625 | (2014.01) | |

(52) U.S. Cl.
CPC ........... *H04N 19/137* (2014.11); *H04N 19/14* (2014.11); *H04N 19/176* (2014.11); *H04N 19/182* (2014.11); *H04N 19/186* (2014.11); *H04N 19/189* (2014.11); *H04N 19/463* (2014.11); *H04N 19/50* (2014.11); *H04N 19/625* (2014.11); *H04N 19/85* (2014.11); *H04N 19/89* (2014.11); *H04N 19/90* (2014.11)

(56) References Cited

U.S. PATENT DOCUMENTS

| | | |
|---|---|---|
| 7,567,719 B2 | 7/2009 | Kalevo et al. |
| 8,861,617 B2 | 10/2014 | Chen et al. |
| 2005/0047504 A1 | 3/2005 | Sung et al. |
| 2005/0117810 A1 | 6/2005 | Bjontegaard |
| 2008/0131002 A1 | 6/2008 | Zhang et al. |
| 2009/0003718 A1 | 1/2009 | Liu et al. |
| 2009/0034621 A1 | 2/2009 | Joch et al. |
| 2010/0098157 A1 | 4/2010 | Yang |
| 2010/0111182 A1 | 5/2010 | Karczewicz et al. |
| 2010/0322303 A1 | 12/2010 | Wada et al. |
| 2011/0135000 A1 | 6/2011 | Alshina et al. |
| 2011/0188574 A1 | 8/2011 | Matsuo et al. |
| 2011/0274158 A1* | 11/2011 | Fu ................... H04N 19/00006 375/240.02 |
| 2012/0177103 A1 | 7/2012 | Fu et al. |
| 2012/0294353 A1* | 11/2012 | Fu ........................ H04N 19/70 375/240.02 |
| 2013/0259118 A1* | 10/2013 | Fu ................... H04N 19/00066 375/240.02 |
| 2014/0003495 A1 | 1/2014 | Chuang et al. |
| 2014/0140416 A1 | 5/2014 | Yamazaki et al. |
| 2014/0192891 A1 | 7/2014 | Alshina et al. |
| 2014/0241417 A1 | 8/2014 | Chong et al. |

FOREIGN PATENT DOCUMENTS

| | | |
|---|---|---|
| EP | 0439569 B1 | 1/1996 |
| EP | 2700230 | 10/2012 |
| EP | 2700230 | 2/2014 |
| JP | 2003-230147 A | 8/2003 |
| JP | 20060032999 A | 2/2006 |
| JP | 2013-541918 A | 11/2013 |
| JP | 2014-506061 A | 3/2014 |
| JP | 2014-514833 A | 6/2014 |
| JP | 2014-516217 A | 7/2014 |
| JP | 2015128334 A | 7/2015 |
| JP | 2015164331 A | 9/2015 |
| KR | 2002-0077888 A | 10/2002 |
| KR | 1020100105680 A | 9/2010 |
| KR | 10-2011-0066177 A | 6/2011 |
| RU | 2313190 C2 | 6/2005 |
| RU | 2300144 C2 | 1/2006 |
| RU | 2300144 C2 | 5/2007 |
| RU | 2313190 C2 | 12/2007 |
| RU | 2402811 C2 | 8/2008 |
| RU | 2402811 C2 | 10/2010 |
| WO | 2010047104 A1 | 4/2010 |
| WO | 2012092787 A1 | 7/2012 |
| WO | 2012092841 A1 | 7/2012 |
| WO | 2012092787 A1 | 10/2012 |
| WO | 2012142966 A1 | 10/2012 |
| WO | 2012154576 A2 | 11/2012 |
| WO | 2012155553 A1 | 11/2012 |
| WO | 2012167712 A1 | 12/2012 |
| WO | 2012176910 A1 | 12/2012 |

OTHER PUBLICATIONS

McCann, et al.; "HM3: High Efficiency Video Coding (HEVC) Test Model 3 Encoder Description", Joint Collaborative Team on Video Coding (JCT-VC) of ITU-T SG16 WP3 and ISO/IEC/JTC1/SC29/WG11, Mar. 2011, 34 pages total.

Communication dated Dec. 9, 2014, issued by the Japanese Patent Office in counterpart Japanese Application No. 2014-518795.

Communication dated Jan. 30, 2015, issued by the European Patent Office in counterpart European Application No. 12803907.0.

Communication dated May 20, 2014 issued by the Korean Intellectual Property Office in counterpart Korean Patent Application No. 10-2012-0069480.

International Search Report issued Jan. 17, 2013 in International Application No. PCT/KR2012/005086 (PCT/ISA/210).

Written Opinion issued Jan. 17, 2013 in International Application No. PCT/KR2012/005086 (PCT/ISA/237).

Chih-Ming Fu, et al; "CE8 Subset3: Picture Quadtree Adaptive Offset"; Joint Collaborative Team on Video Coding (JCT-VC) of ITU-T SG16 WP3 and ISO/IEC JTC1/SC29/WG11, $4^{th}$ meeting; Daegu, KR Jan. 20-28, 2011, pp. 1-10.

Communication dated Sep. 15, 2014, issued by the Korean Intellectual Property Office in counterpart 10-2012-0069480.

Ken McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11 1st Meeting: Dresden, DE, Apr. 15-23, 2010, 40 pages total, JCTVC-A124.

Communication dated Dec. 9, 2014 issued by the Japanese Patent and Trademark Office in Japanese Patent Application No. JP 2014-518795.

Chih-Ming Fu, et al., "CE13: Sample Adaptive Offset with LCU-Independent Decoding," Joint Collaborative Team on Video Coding (JCT-VC) of ITU-T SG16 WP3 and ISO/IEC JTC1/SC29/WG11, $5^{th}$ Meeting: Mar. 16-23, 2011, pp. 1-6.

Communication dated May 26, 2015, issued by the European Patent Office in counterpart European Application No. 14192822.6.

Communication (Office Action) dated Jun. 16, 2015, issued by the European Patent Office in counterpart European Application No. 14192822.6.

Communication dated May 26, 2015, issued by the European Patent Office in counterpart European Application No. 15153359.3.

Ching-Yeh Chen et al.; "CE8 Subset2: A Joint Proposal on Improving the Adaptive Loop Filter in TMuC0.9 by MediaTek, Qualcomm, and Toshiba", 95. MPEG Meeting; Jan. 24, 2011-Jan. 28, 2011; (Motion Picture Expert Group or ISO/IEC JTC1/SC29/WG11),, No. m18871, Jan. 24, 2011, Total 18 pages, XP 030047440.

Communication dated Sep. 8, 2015 issued by the Japanese Patent Office in counterpart Japanese Patent Application No. 2014-518795.

Chih-Ming Fu et al.; "Sample Adaptive Offset With LCU-Based Syntax"; Joint Collaborative Team on Video Coding (JCT-VC) of ITU-T SG16 WP3 and ISO/IEC JTC1/SC29/WG11; 6th Meeting: Torino, IT; Jul. 14-22, 2011; Document: JCTVC-F056; pp. 1-6; 7 pgs. total.

Communication issued on Feb. 1, 2016 by the Russian Patent Office in related Application No. 2014102576.

Tan et al., "CE9: Skip/Merge Simplification with Reduced Candidate Set (Test L)", Joint Collaborative Team on Video Coding (JCT-VC) of ITU-T SG16 WP3 and ISO/IEC JTC1/SC29/WG11, 5th Meeting, Mar. 16-23, 2011, 4 total pages.

Alshina et al., "AHG5/AHG6: On reducing context models for SAO merge syntax", Joint Collaborative Team on Video Coding (JCT-VC) of ITU-T SG16 WP3 and ISO/IEC JTC1/SC29/WG11, 10th meeting, Jul. 11-20, 2012, 3 total pages.

(56) References Cited

OTHER PUBLICATIONS

Bross et al., "High efficiency video coding (HEVC) text specification draft 6", Joint Collaborative Team on Video Coding (JCT-VC) of ITU-T SG16 WP3 and ISO/IEC JTC1/SC29/WG11, 7th Meeting, Nov. 21-30, 2011, 274 total pages.
Kim, "CE8 Subset c: Necessity of Sign Bits for SAO Offsets", Joint Collaborative Team on Video Coding (JCT-VC) of ITU-T SG16 WP3 and ISO/IEC JTC1/SC29/WG11, 8th Meeting, Feb. 1-10, 2012, 10 total pages.
Wiegand et al., "WD3: Working Draft 3 of High Efficiency Video Coding", Joint Collaborative Team on Video Coding (JCT-VC) of ITU-T SG16 WP3 and ISO/IEC JTC1/SC29/WG11, 5th Meeting, Mar. 16-23, 2011, 221 total pages.
Chih-Ming Fu, et al; "CE8 Subset3: Picture Quadtree Adaptive Offset"; Joint Collaborative Team on Video Coding (JCT-VC) of ITU-T SG16 WP3 and ISO/IEC JTC1/SC29/WG11, 4th meeting; Daegu, KR Jan. 20-28, 2011; pp. 1-10.
Chih-Ming Fu et al.; "Sample Adaptive Offset With LCU-Based Syntax"; Joint Collaborative Team on Video Coding (JCT-VC) of ITU-T SG16 WP3 and ISO/IEC JTC/SC29/WG11; 6th Meeting: Torino, IT; Jul. 14-22, 2011; Document: JCTVC-F056; pp. 1-6; 7 pgs. total.
Communication issued on Dec. 11, 2015 by the Korean Intellectual Property Office in related Application No. 10-2014-0054355.
Communication issued on Dec. 11, 2015 by the Korean Intellectual Property Office in related Application No. 10-2014-0148729.
Communication issued on Dec. 11, 2015 by the Korean Intellectual Property Office in related Application No. 10-2015-0024015.
Communication issued on Dec. 11, 2015 by the Korean Intellectual Property Office in related Application No. 10-2015-0024016.
Communication issued on Feb. 17, 2016 by the European Patent Office in related Application No. 12803907.0.
Communication issued on Jan. 19, 2016 by the Japanese Patent Office in related Application No. 2014-518795.
Communication issued on Jan. 19, 2016 by the Japanese Patent Office in related Application No. 2015-080408.
Communication issued on Jan. 19, 2016 by the Japanese Patent Office in related Application No. 2015-080409.
Communication issued on Jan. 19, 2016 by the Japanese Patent Office in related Application No. 2015-080410.
Communication issued on Jan. 19, 2016 by the Japanese Patent Office in related Application No. 2015-080411.
Communication issued on Feb. 1, 2016 by the Russian Patent Application in related Application No. 201402576/08(003899).
Communication issued on Jan. 28, 2016 by the Taiwanese Patent Office in related Application No. 104119675.
Tan et al. "CE9: Skip/Merge Simplification with Reduced Candidate Set (Test L)", Joint Collaborative Team on Video Coding (JCT-VC) of ITU-T SG16 WP3 and ISO/IEC JTC1/SC29/WG11, 5th Meeting, Mar. 16-23, 2011, 4 total pages.
"Test Model Under Consideration", Joint Collaborative Team on Video Coding (JCT-VC) of ITU-T SG16 WP3 and ISO/IEC JTC1/SC29/WG11, 1st Meeting, Apr. 15-23, 2010, 30 total pages.
Alshina et al., "AHG5/AHG6: On reducing context models for SAO merge syntax", Joint Collaborative Team on Video Coding (JCT-VC) of ITU-T SG16 WP3 and ISO/IEC JTC/SC29/WG11, 10th meeting, Jul. 11-20, 2012, 3 total pages.
Segall et al., "CE2: Inter-layer Prediction for Bit-Depth Scalable Coding", Joint Video Team (JVT) of ISO/IEC MPEG & ITU-T VCEG (ISO/IEC JTC1/SC29/WG11 and ITU-T SG16 Q.6), 24th Meeting, Jun. 29-Jul. 5, 2007, 8 total pages.
Kim, "CE8 Subset c: Necessity of Signs Bits for SAO Offsets", Joint Collaborative Team on Video Coding (JCT-VC) of ITU-T SG16 WP3 and ISO/IEC JTC1/SC29/WG11, 8th Meeting, Feb. 1-10, 2012, 10 total pages.
Bross et al., "High efficiency video coding (HEVC) text specification draft 6", Joint Collaborative Team on Video Coding (JCT-VC) of ITU-T SG16 WP3 and ISO/IEC JTC1/SC29/WG11, 7th Meeting, Nov. 21-30, 2011, 275 total pages.
Wiegand et al., "WD3: Working Draft 3 on High Efficiency Video Coding", Joint Collaborative Team on Video Coding (JCT-VC) of ITU-T SG16 WP3 and ISO/IEC JTC1/SC29/WG11, 5th Meeting, Mar. 16-23, 2011, 221 total pages.
Communication issued on Aug. 20, 2015 by the Korean Intellectual Property Office in related Application No. 1-2014-0054355.
Communication issued on Aug. 20, 2015 by the Korean Intellectual Property Office in related Application No. 10-2014-0148729.
Shao Li et al., "Simplifications and improvement of merge mode coding" JCTVC-E292, Mar. 16-23, 2011, 5 total pages.
Communication issued on Aug. 20, 2015 by the Korean Intellectual Property Office in related Application No. 10-2015-0024015.
Communication issued on Aug. 20, 2015 by the Korean Intellectual Property Office in related Application No. 10-2015-0024016.
Chih-Ming Fu et al., "CE13: Sample Adaptive Offset with LCU-Independent Decoding", Joint Collaborative Team on Video Coding (JCT-VC) of ITU-T SG16 WP# and ISO/IEC/JTC1/SC29/WG11, Mar. 2011, 7 pages total.
Communication dated Jun. 3, 2016, issued by the State Intellectual Property Office of P.R. China in counterpart Chinese Application No. 201510217348.0.
Communication dated Jun. 2, 2016, issued by the State Intellectual Property Office of P.R. China in counterpart Chinese Application No. 201510218544.X.

\* cited by examiner

FIG. 14
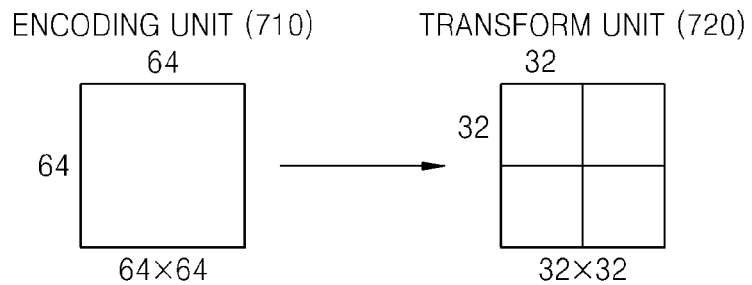
FIG. 15
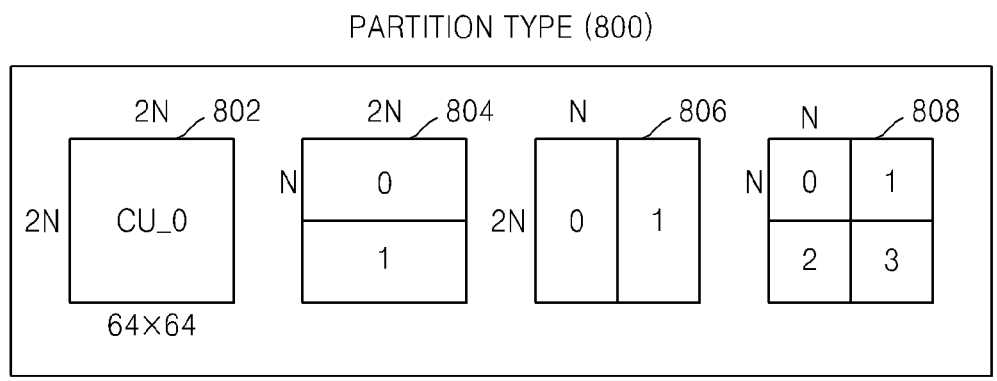
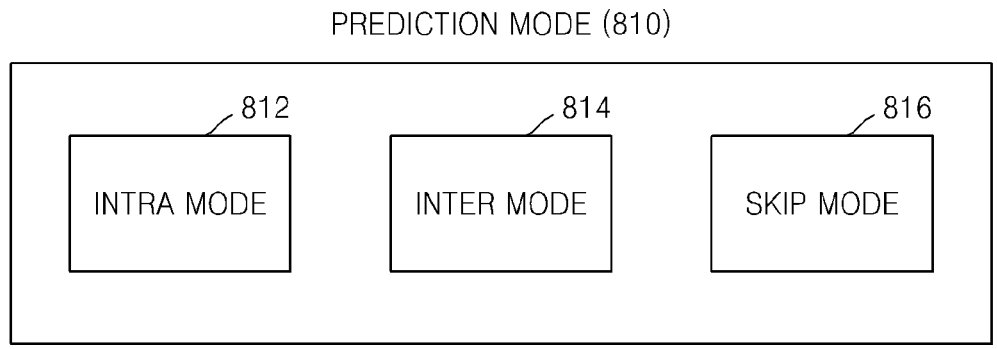
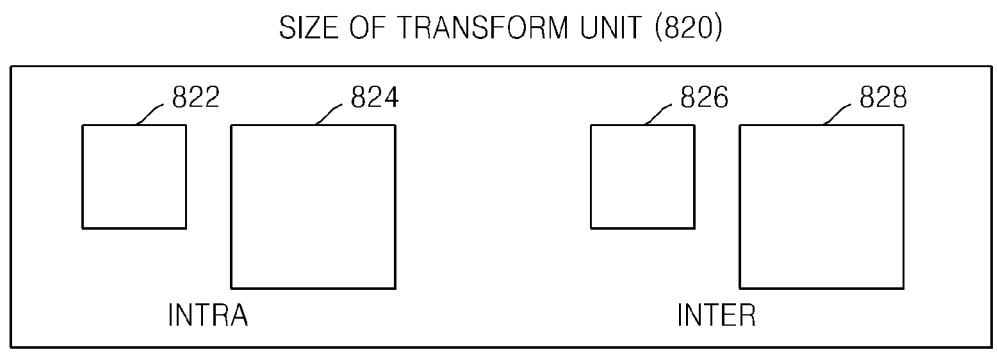

ENCODING UNIT (1010)

PREDICTION UNIT (1060)

VIDEO ENCODING METHOD USING OFFSET ADJUSTMENTS ACCORDING TO PIXEL CLASSIFICATION AND APPARATUS THEREFOR, VIDEO DECODING METHOD AND APPARATUS THEREFOR

CROSS-REFERENCE TO RELATED APPLICATION

This application is a continuation application of U.S. patent application Ser. No. 14/130,011, filed on Mar. 7, 2014 in the U.S. Patent and Trademark Office, which is a National Stage application under 35 U.S.C. §371 of International Application No. PCT/KR2012/005086, filed on Jun. 27, 2012, and claims the benefit of U.S. Provisional Application No. 61/502,018, filed on Jun. 28, 2011, in the U.S. Patent and Trademark Office, the disclosures of which are incorporated herein by reference in their entireties.

1. FIELD

Methods and apparatuses consistent with exemplary embodiments relate to video encoding and decoding, and more particularly to video encoding and decoding to minimize an error between an original image and a restored image.

2. DESCRIPTION OF RELATED ART

As hardware for reproducing and storing high resolution or high quality video content is being developed, there is a need for a video codec for effectively encoding or decoding the high resolution or high quality video content. In a conventional video codec, a video is encoded according to a limited encoding method based on a macroblock having a predetermined size.

Image data of a spatial domain is transformed into coefficients of a frequency region by using frequency transformation. A video codec splits an image into blocks having predetermined sizes, performs discrete cosine transformation (DCT) transformation on each block, and encodes frequency coefficients in block units to perform a fast arithmetic operation of the frequency transformation. The coefficients of the frequency region are easily compressible types compared to the image data of the spatial domain. In particular, an image pixel value of the spatial domain is expressed as a prediction error through inter prediction or intra prediction of the video codec, and thus if the frequency transformation is performed on the prediction error, data may be transformed to 0. The video codec replaces data that continuously and repetitively occurs with data having small sizes, thereby reducing an amount of data.

SUMMARY

One or more exemplary embodiments provide a video encoding method and apparatus and a video decoding method and apparatus to generate a restored image having a minimum error with respect to an original image.

According to an aspect an exemplary embodiment, there is provided a video decoding method including: parsing from a bitstream offset merge information indicating whether offset parameters of a current block and offset parameters of at least one neighboring block adjacent to the current block are identical; restoring an offset type and offset values of the current block from the offset parameter of the current block based on the offset merge information; determining an edge class or a pixel value band of a restored pixel of the current block based on an edge type or a pixel value band type of the current block indicating the offset type; and determining an offset value corresponding to the edge class or the pixel value band of the restored pixel from the restored offset values of the current block and adjusting a pixel value of the restored pixel of the current block according to the restored offset values of the current block.

According to an aspect of an exemplary embodiment, there is provided a video encoding method including: determining an edge class according to an edge type of a current block from among blocks of video or a pixel value band according to a pixel value band type of the current block; determining an offset value corresponding to the edge class or the pixel value band based on difference values between restored pixels and original pixels included in the edge class or the pixel value band; and when an offset parameter of each block comprises an offset type indicating the edge type or the pixel value band type and an offset corresponding to the edge class or the pixel value band, based on identities between offset parameters of the current block and offset parameters of at least one neighboring block adjacent to the current block, encoding offset merge information of the current block indicating whether the offset parameter of the current block is encoded.

According to an aspect of an exemplary embodiment, there is provided a video decoding apparatus including: an offset parameter parsing unit configured to parse from a bitstream offset merge information indicating whether offset parameters of a current block and offset parameters of at least one neighboring block adjacent to the current block are identical, and to restore an offset type and offset values of the current block from the offset parameter of the current block based on the offset merge information; and an offset adjusting unit configured to determine an edge class or a pixel value band of a restored pixel based on an edge type or a pixel value band type of the current block indicating the offset type, and to determine an offset value corresponding to the edge class or the pixel value band of the restored pixel from the restored offset values of the current block and to adjust a pixel value of the restored pixel of the current block according to the restored offset values of the current block.

According to an aspect of an exemplary embodiment, there is provided a video encoding apparatus including: an offset determining unit configured to determine an edge class according to an edge type of a current block from among blocks of video or a pixel value band according to a pixel value band type of the current block, and to determine an offset value corresponding to the edge class or the pixel value band based on difference values between restored pixels and original pixels included in the edge class or the pixel value band; and an offset parameter encoding unit configured to, when an offset parameter of each block comprises an offset type indicating the edge type or the pixel value band type and an offset corresponding to the edge class or the pixel value band, based on identities between offset parameters of the current block and offset parameters of at least one neighboring block adjacent to the current block, encode offset merge information of the current block indicating whether the offset parameter of the current block is encoded.

BRIEF DESCRIPTION OF THE DRAWINGS

The above and other aspects will become more apparent by describing in detail exemplary embodiments thereof with reference to the attached drawings in which:

FIG. 14 is a diagram for describing a relationship between a coding unit and transformation units, according to an exemplary embodiment;

FIG. 15 is a diagram for describing encoding information of coding units corresponding to a coded depth, according to an exemplary embodiment;

DETAILED DESCRIPTION OF EXEMPLARY EMBODIMENTS

Hereinafter, the exemplary embodiments will be described more fully with reference to the accompanying drawings, in which the exemplary embodiments are shown.

As used herein, the term "and/or" includes any and all combinations of one or more of the associated listed items.

A video encoding method and a video decoding method that are performed by adjusting offset according to pixel classification according to an exemplary embodiment will be described with reference to FIGS. 1 through 7 below. Also, an exemplary embodiment in which a video encoding method and a video decoding method based on coding units having a tree structure uses an offset adjustment according to pixel classification according to an exemplary embodiment will be described with reference to types of pixel offsets or pixel bands and FIG. 20 below. Hereinafter, an "image" may mean a still image of video, a moving image thereof, i.e., video itself.

First, a video encoding method and a video decoding method that are performed by adjusting offset according to pixel classification according to an exemplary embodiment will now be described with reference to FIGS. 1 through 7 below.

Figure 1:
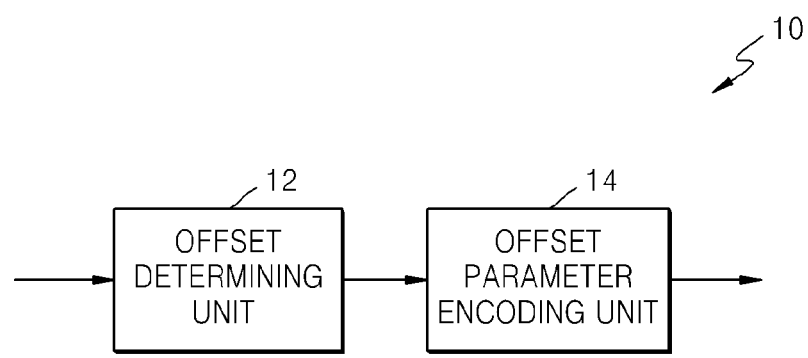
FIG. 1 is a block diagram of a video encoding apparatus, according to an exemplary embodiment.

FIG. 1 is a block diagram of a video encoding apparatus 10, according to an exemplary embodiment.

The video encoding apparatus 10 according to an exemplary embodiment includes an offset determining unit 12 and an offset parameter encoding unit 14.

The video encoding apparatus 10 according to an exemplary embodiment receives images of video, splits each image into blocks, and encodes the images for each block. A block type may be a square or a rectangle, and may be an an arbitrary geometrical shape. The block type is not limited to a data unit having a uniform size. The block according to an exemplary embodiment may be a maximum encoding unit, an encoding unit, etc., among encoding units in a tree structure. Video encoding and decoding methods based on the encoding units in the tree structure will be described later with reference to FIGS. 8 to 20.

The video encoding apparatus 10 according to an exemplary embodiment may perform intra prediction, inter prediction, transformation, and quantization for each image block, generate samples, perform entropy encoding on the samples, and output the samples in a bitstream.

The video encoding apparatus 10 according to an exemplary embodiment may encode an offset value indicating a difference value between a pixel of an original image (an original pixel) and a pixel of a restored image (a restored pixel) to minimize an error between the original pixel and the restored pixel.

The video encoding apparatus 10 according to an exemplary embodiment may determine the offset value for each predetermined data unit such as a picture, a slice, a block, etc. An offset parameter including the offset value and an offset type may be encoded for each predetermined data unit.

The offset determining unit 12 according to an exemplary embodiment determines an edge type or a pixel value band type of a current block. The offset determining unit 12 may determine whether it is suitable to classify pixels of the current block based on the edge type or the pixel value band type according to a pixel characteristic of the current block.

The edge type according to an exemplary embodiment may indicate directions and sizes of edges formed by the restored pixel and neighboring pixels. Also, when a total range band of pixel values of the current block is split into a predetermined number of bands, the pixel value band type according to an exemplary embodiment may indicate the total number of the bands of the pixel values, a range of each band, etc.

In a case where an offset value of the current block is determined according to the edge type, the offset determining unit 12 according to an exemplary embodiment may determine an edge class that belongs to each restored pixel. The edge class according to an exemplary embodiment indicates whether a currently restored pixel is a pixel of an edge. For example, the edge class may indicate whether the currently restored pixel is an extreme point of the edge, is an edge pixel constituting the edge, or is not a pixel constituting the edge, etc.

In the case where the offset value of the current block is determined according to the edge type, the offset determining unit 12 according to an exemplary embodiment may compare a pixel value of the currently restored pixel with pixel values of neighboring pixels disposed neighboring the currently restored pixel according to directions and sizes of edges and determine the edge class indicating whether the currently restored pixel is the edge pixel.

In a case where the offset value of the current block is determined according to the pixel value band type, the offset determining unit 12 according to an exemplary embodiment may determine a pixel value band that belongs to each restored pixel. The pixel value band according to an exemplary embodiment indicates a pixel value band to which the pixel value of the currently restored pixel belongs from among a plurality of pixel value bands. The plurality of pixel value bands may be split according to an equal pixel value range. Also, the plurality of pixel value bands may be split according to an unequal pixel value range. That is, the offset determining unit 12 may determine the pixel value band indicating a pixel value range to which the pixel value of the currently restored pixel belongs from among the plurality of pixel value bands.

The offset determining unit 12 according to an exemplary embodiment determines an offset value corresponding to an edge class or a pixel value band of a restored pixel by using difference values between restored pixels and original pixels included in the same edge class or pixel value band as the restored pixel.

The offset determining unit 12 according to an exemplary embodiment may an average of difference values between restored pixels and original pixels included in the same edge class as the current edge class or the same pixel value band as the current pixel value band, i.e. an average error of the restored pixels, as an offset value corresponding to the current edge class or the current pixel value band.

The offset determining unit 12 may determine an edge class or a pixel value band for each restored pixel in the current block. Accordingly, the offset determining unit 12 may determine each offset value corresponding to each edge class of a block. Also, the offset determining unit 12 may determine each offset value corresponding to each pixel value band of the block.

The offset parameter encoding unit 14 according to an exemplary embodiment may encode an offset type and an offset value of each block. The offset type according to an exemplary embodiment indicates the edge type of each block or the pixel value band type thereof.

An offset parameter of each block may include the offset type and the offset value of each block. If the offset type is the edge type, the offset parameter may include offset values corresponding to each edge class. Also, if the offset type is the pixel value band type, the offset parameter may include offset values corresponding to each pixel value band. That is, the offset parameter encoding unit 14 may encode the offset parameter for each block.

The offset parameter encoding unit 14 according to an exemplary embodiment may encode offset merge information of the current block indicating whether to encode an offset parameter of the current block, based on identities of offset parameters of the current block and at least one neighboring block.

If at least one of offset parameters of a left block and a right block of the current block is identical to the offset parameter of the current block, the offset parameter encoding unit 14 according to an exemplary embodiment may encode the offset merge information except for the offset parameter of the current block.

If the offset parameters of the left block and the right block of the current block are different from the offset parameter of the current block, the offset parameter encoding unit 14 according to an exemplary embodiment may encode the offset merge information and the offset parameter of the current block.

If partial information of offset parameters of the neighboring block is identical to the offset parameter of the current block, the offset parameter encoding unit 14 according to an exemplary embodiment may encode offset merge information of one bit, and encode only information of the offset parameter of the current block except for the identical partial information of the offset parameters of the neighboring block to the offset parameter of the current block. For example, if the current block and the neighboring block are identical in terms of offset values, the offset merge information of one bit and the offset type may be encoded for the current block.

The offset parameter encoding unit 14 according to an exemplary embodiment may encode differential information between offset values of the neighboring block and a current offset.

If an offset is 0, the offset parameter encoding unit 14 according to an exemplary embodiment may encode an offset parameter other than the offset.

The offset parameter encoding unit 14 according to an exemplary embodiment may predict and encode at least one color component among a luma component and chroma components of the current block by referring to offset parameters of other color components. For example, the offset parameters the luma component and the chroma components are predicted and encoded by sharing or mutually referring to offset parameters. As another example, offset parameters of a first chroma component and a second chroma component are predicted and encoded by sharing or mutually referring to offset parameters.

The video encoding apparatus 10 according to an exemplary embodiment may include a central processor (not shown) that generally controls the offset determining unit 12 and the offset parameter encoding unit 14. Alternatively, the offset determining unit 12 and the offset parameter encoding unit 14 may operate by their respective processors (not shown) that interactively operate, and thus the video encoding apparatus 10 may generally operate. Alternatively, the offset determining unit 12 and the offset parameter encoding unit 14 may be controlled by the control of an external processor (not shown) of the video encoding apparatus 10 according to an exemplary embodiment.

The video encoding apparatus 10 according to an exemplary embodiment may include at least one data storage unit (not shown) that stores input and output data of the offset determining unit 12 and the offset parameter encoding unit 14. The video encoding apparatus 10 may include a memory control unit (not shown) that controls data input and output of the data storage unit (not shown).

The video encoding apparatus 10 according to an exemplary embodiment may operate in connection with an internal video encoding processor installed therein or an external video encoding processor to output a video encoding result, thereby performing a video encoding operation including transformation. The internal video encoding processor of the video encoding apparatus 10 according to an exemplary embodiment may include a separate processor as well as the video encoding apparatus 10, a central operating apparatus, or a graphic operating apparatus may include a video encoding processing module to implement a basic video encoding operation.

Figure 2:
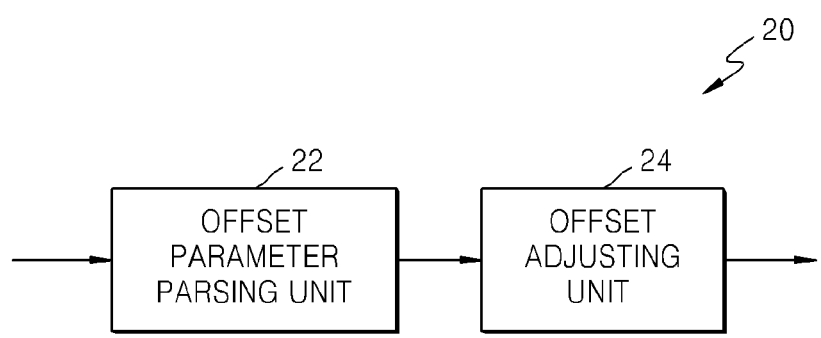
FIG. 2 is a block diagram of a video decoding apparatus, according to an exemplary embodiment.

FIG. 2 is a block diagram of a video decoding apparatus 20, according to an exemplary embodiment.

The video decoding apparatus 20 according to an exemplary embodiment includes an offset parameter parsing unit 22 and an offset adjusting unit 24.

The video decoding apparatus 20 according to an exemplary embodiment receives a bitstream including encoded video data. The video decoding apparatus 20 may parse video samples encoded from the received bitstream, perform entropy encoding, inverse quantization, inverse transformation, and prediction and motion compensation on each image block, generate restored pixels, and generate a resultant restored image. Also, the video decoding apparatus 20 according to an exemplary embodiment may receive an offset value indicating a difference value between an original pixel and a restored pixel to minimize an error between an original image and the restored image.

The offset parameter parsing unit 22 according to an exemplary embodiment may parse from the bitstream offset merge information indicating whether offset parameters of a current block and at least one neighboring block from among blocks of video are identical to each other.

The offset parameter parsing unit 22 according to an exemplary embodiment may restore offset types and offset values among offset parameters of the current block based on offset merge information of the current block.

For example, the offset parameter parsing unit 22 may parse and restore an offset parameter of the current block from the bitstream if the offset parameters of the current block and at least one neighboring block are different from each other based on the offset merge information of the current block. However, the offset parameter parsing unit 22 may restore the offset parameter of the current block by using the offset parameter of the at least one neighboring bock without parsing the offset parameter of the current block from the bitstream if the offset parameters of the current block and at least one neighboring block are identical to each other based on the offset merge information of the current block.

The offset adjusting unit 24 according to an exemplary embodiment may determine an edge class or a pixel value band of the restored pixel, based on an edge type or a pixel value band type of the current block indicating an offset type of the current block.

The offset adjusting unit 24 according to an exemplary embodiment may determine an offset value corresponding to the edge class or the pixel value band of the restored pixel from offset values of the current block. The offset adjusting unit 24 may adjust a pixel value of the restored pixel by an offset.

The offset adjusting unit 24 according to an exemplary embodiment may determine an edge class or a pixel value band for each restored pixel of the current block. Accordingly, the offset adjusting unit 24 may determine an offset value corresponding to the determined edge class or pixel value band for each restored pixel among restored offset values and adjust each restored pixel by an offset.

If the offset type of the current block is the edge type, the offset adjusting unit 24 according to an exemplary embodiment may compare pixel values of a current block pixel and neighboring pixels of a currently restored pixel disposed according to an edge direction and an edge size, and determine an edge class of the currently restored pixel. Accordingly, the offset adjusting unit 24 may determine an offset value corresponding to the edge class of the currently restored pixel among the offset values. The offset adjusting unit 24 may calculate an average of difference values between restored pixels included in the same edge class as a current edge class and original pixels and determine the average as an offset corresponding to the currently restored pixel.

If the offset type of the current block is the pixel value band type, the offset adjusting unit 24 according to an exemplary embodiment may determine a pixel value band to which the pixel value of the currently restored pixel belongs, from among a plurality of bands. Accordingly, the offset adjusting unit 24 may determine an offset value corresponding to the pixel value band of the currently restored pixel from among the restored offset values. The offset value selected by the offset adjusting unit 24 from the restored offset values may be an average of difference values between restored pixels included in the same pixel value band as a current pixel value band and original pixels.

For a more detailed description of the offset parameter adjusting unit 22, if at least one of offset parameters of a left block and a right block of the current block is identical to the offset parameter of the current block based on offset merge information, the offset parameter of the current block may be restored to be the same as the at least one of offset parameters of the left block and the right block of the current block. A block having an offset parameter that is to be referred to may be determined from among neighboring blocks based on the offset merge information.

Furthermore, if the offset parameters of the left block and the right block of the current block are different from the offset parameter of the current block based on offset merge information, the offset parameter adjusting unit 22 may parse and restore the offset parameter of the current block from the bitstream.

Furthermore, if offset merge information of one bit parsed from the bitstream indicates that partial information of the offset parameters of the neighboring block is identical to the offset parameter of the current block, the offset parameter adjusting unit 22 may restore partial information of the offset parameter of the current block by using the partial information of the offset parameters of the neighboring block. The remaining information of the offset parameter of the current block may be parsed and restored from the bitstream.

Furthermore, the offset parameter adjusting unit 22 may parse and restore differential values of the offset values from the bitstream. In this case, the offset parameter adjusting unit 22 may combine differential information between offset values of the neighboring block and offset values of the current block and predict and restore the offset values of the current block.

Furthermore, the offset parameter adjusting unit 22 may restore the offset value to 0 if the offset parameter does not include at least one offset value.

The offset parameter parsing unit 22 according to an exemplary embodiment may predict and restore an offset parameter of at least one color component among a luma component and chroma components of the current block by reciprocally referring to offset parameters of color components. For example, offset parameters of the luma component and the chroma components may be restored by sharing or referring to offset parameters. As another example, offset parameters of a first chroma component and a second chroma component may be predicted and restored by sharing or referring to offset parameters.

The video decoding apparatus 20 according to an exemplary embodiment may include a central processor (not shown) that generally controls the offset parameter parsing unit 22 and the offset adjusting unit 24. Alternatively, the offset parameter parsing unit 22 and the offset adjusting unit 24 may operate by their respective processors (not shown)

that interactively operate, and thus the video decoding apparatus 20 may generally operate. Alternatively, the offset parameter parsing unit 22 and the offset adjusting unit 24 may be controlled by the control of an external processor (not shown) of the video decoding apparatus 20 according to an exemplary embodiment.

The video decoding apparatus 20 according to an exemplary embodiment may include at least one data storage unit (not shown) that stores input and output data of the offset parameter parsing unit 22 and the offset adjusting unit 24. The video decoding apparatus 20 may include a memory control unit (not shown) that controls data input and output of the data storage unit (not shown).

The video decoding apparatus 20 according to an exemplary embodiment may operate in connection with an internal video decoding processor installed therein or an external video decoding processor to restore video through video decoding, thereby performing a video decoding operation. The internal video decoding processor of the video decoding apparatus 20 according to an exemplary embodiment may include a separate processor as well as the video decoding apparatus 20, a central operating apparatus, or a graphic operating apparatus may include a video decoding processing module to implement a basic video decoding operation.

The video encoding apparatus 10 and the video decoding apparatus 20 according to an exemplary embodiment use a sample adaptive offset (SAO) to minimize an error between an original pixel and a restored pixel. By using the SAO according to an exemplary embodiment, the video encoding apparatus 10 classifies pixels of each image block into predetermined pixel groups, allocates each pixel to a corresponding pixel group, and encodes an offset value indicating an average value of errors between original pixels and restored pixels included in the same pixel group.

Samples are encoded and transmitted between the video encoding apparatus 10 and the video decoding apparatus 20. That is, the video encoding apparatus 10 may encode samples and transmit the encoded samples as bitstream types, and the video decoding apparatus 20 may parse and restore the samples from a received bitstream. The video encoding apparatus 10 and the video decoding apparatus 20 according to an exemplary embodiment adjust restored pixel values according to the offset value determined through the pixel classification and encode/decode offset parameters to minimize the error between the original pixel and the restored pixel. Signaling, which involves encoding, transmitting, receiving, and decoding offset values as offset parameters is performed between the video encoding apparatus 10 and the video decoding apparatus 20.

Therefore, by using the SAO according to an exemplary embodiment, the video decoding apparatus 20 may decode the received bitstream, generate restored pixels for each image block, restore offset values from the bitstream, and adjust the restored pixels by corresponding offsets, thereby generating a restored image having a minimum error with respect to an original image.

Hereinafter, exemplary embodiments of classifying pixels into pixel groups for the SAO according to an exemplary embodiment will now be described. By using the SAO according an exemplary embodiment, pixels may be classified (i) according to edge types constituting restored pixels or (ii) according to pixel value band types thereof. Whether to classify pixels according to edge types or pixel value band types may be defined by offset types according to an exemplary embodiment.

An exemplary embodiment of classifying pixels according to edge types by using the SAO according to an exemplary embodiment will now be described.

An edge class of each restored pixel included in a current block may be determined according to a current edge type determined for the current block. That is, edge classes of currently restored pixels may be defined by comparing pixel values of the currently restored pixels and neighboring pixels.

For example, the edge class may be determined according to <process 1> below.

<Process 1>
Class=0;
for i, j∈Ω
  if Rec(i, j)<Rec(x, y) then Class ++
  if Rec(i, j)<Rec(x, y) then Class −− x and y of a currently restored pixel Rec(x, y) denote a horizontal coordinate and a vertical coordinate, respectively. i and j of a neighboring pixel Rec(i, j) neighboring the currently restored pixel Rec(x, y) denote a horizontal coordinate and a vertical coordinate, respectively. Ω denotes a space range in which the neighboring pixel Rec(i, j) is disposed, which is a comparison target of the currently restored pixel Rec(x, y). That is, according to <Process 1> above, an edge class Class of the currently restored pixel Rec(x, y) may be determined according to the number of neighboring pixels Rec(i, j). Among the neighboring pixel Rec(i, j) disposed in a predetermined space range, the edge class Class may increase according to the number of neighboring pixels Rec(i, j) having a greater pixel value than the currently restored pixel Rec(x, y), and the edge class Class may decrease according to the number of neighboring pixels Rec(i, j) having a smaller pixel value than the currently restored pixel Rec(x, y).

The <neighboring pixel space range Ω> in which the neighboring pixel Rec(i, j) is disposed may be defined as presented below.

<Maximum Neighboring Pixel Range>
(i, j)∈0, but (i, j)≠(x, y)
x−M≤i≤x+M, & y−M≤j≤y+M M denotes a maximum horizontal and vertical distance from the currently restored pixel Rec(x, y) to the neighboring pixel Rec(i, j). Thus, the maximum neighboring pixel range may include the maximum number (4M^2+4M) of neighboring pixels disposed around the currently restored pixel Rec(x, y). In this case, the edge class Class may be in a range from a minimum of −(4M^2+4M) to a maximum of (4M^2+4M). A center value of the edge class Class range may indicate that the currently restored pixel Rec(x, y) is a pixel disposed around an edge other than an edge pixel. The number of the neighboring pixel Rec(i, j) within the neighboring pixel space range Ω may increase or decrease according to an edge type. M may be 1 to minimize an operation amount.

For example, in a case where the edge type is a vertical edge, the currently restored pixel Rec(x, y) may be compared to a neighboring pixel disposed in a horizontal direction in terms of a pixel value. That is, the neighboring pixel space range Ω of the vertical edge may be determined as presented below.

<Neighboring Pixel Space Range Ω of Vertical Edge>
(i, j)∈0, but (i, j)≠(x, y)
x−M≤i≤x+M, & j=y A type and size of the neighboring pixel space range Ω may be determined according to an edge type such as the vertical edge, a horizontal edge, a diagonal edge, a strict maximum, and a strict minimum formed by pixels within the neighboring pixel space range Ω. An edge class value indicates whether a pixel is included in an edge or is disposed around the edge. Thus, an offset for correcting pixel values constituting the edge according to a combination of the edge type and the edge class may be determined, and thus a pixel group may be defined according to the combination of the edge type and the edge class.

The number of neighboring pixels included in the neighboring pixel space range Ω may be determined according to the edge type. The edge class value may be determined within a range of the number of neighboring pixels. Therefore, the video encoding apparatus 10 and the video decoding apparatus 20 may encode and transmit and receive a corresponding offset value for each edge class of a current edge type, and adjust a restored pixel according to the offset value. Hereinafter, coefficients of edge classes according to a predetermined edge type are referred to as lengths of an offset value that is to be encoded and transmitted to the video decoding apparatus 20.

In a case where an offset value used for a predetermined combination of the edge type and the edge class, i.e., an offset value for an edge class N of the current edge type, is previously determined as 0, there is no need to encode and transmit the offset value to the video decoding apparatus 20. In this case, the length for the predetermined combination of the edge type and the edge class may be reduced.

Therefore, the video encoding apparatus 10 and the video decoding apparatus 20 may classify pixels according to an image characteristic, such as an edge type, determine an average error value between pixels having the same characteristic as an offset, and adjust restored pixels according to the offset, thereby minimizing an error between an original image and a restored image.

Figure 3:
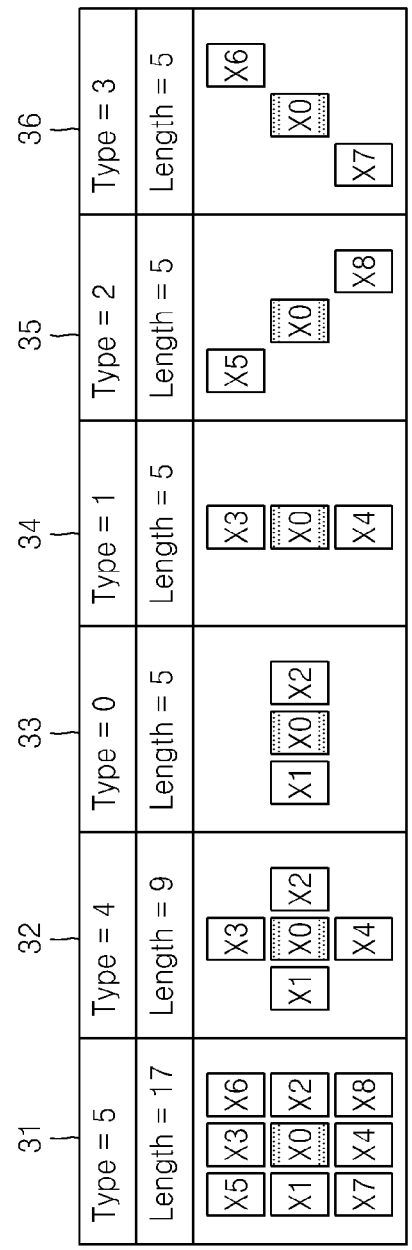
FIG. 3 is a table of edge types and lengths for pixel classification, according to an exemplary embodiment.

FIG. 3 is a table of edge types 31, 32, 33, 34, 35, and 36 and lengths for pixel classification, according to an exemplary embodiment.

Indices 5, 4, 0, 1, 2, and 3 may be sequentially allocated to the edge types 31, 32, 33, 34, 35, and 36. The higher the hit ratio of appearance of the edge types 31, 32, 33, 34, 35, and 36, the smaller the indices 5, 4, 0, 1, 2, and 3 may be allocated to the edge types 31, 32, 33, 34, 35, and 36. An edge class of a currently restored pixel X0 may be determined by comparing pixel values of the currently restored pixel X0 and eight neighboring pixels X1, X2, X3, X4, X5, X6, X7, and X8 adjacent to the currently restored pixel X0 with respect to the edge type 31 of the index 5. In this case, the number of edge classes allocated to the currently restored pixel X0 is 17, and thus a length may be determined as 17.

As described above, the number of edge classes is determined as 9 by comparing currently restored pixel values of the currently restored pixel X0 and four neighboring pixels X1, X2, X3, and X4 horizontally and vertically adjacent to the currently restored pixel X0 with respect to the edge type 32 of the index 4, and thus a length may be determined as 9.

Also, the number of edge classes is determined as 5 by comparing currently restored pixel values of the currently restored pixel X0 and two neighboring pixels X1 and X2 horizontally adjacent to the currently restored pixel X0 with respect to the edge type 33 of the index 0, and thus a length may be determined as 5.

Also, the number of edge classes is determined as 5 by comparing currently restored pixel values of the currently restored pixel X0 and two neighboring pixels X3 and X4 horizontally adjacent to the currently restored pixel X0 with respect to the edge type 34 of the index 1, and thus a length may be determined as 5.

Also, the number of edge classes is determined as 5 by comparing currently restored pixel values of the currently restored pixel X0 and two neighboring pixels X5 and X8 adjacent to the currently restored pixel X0 in a diagonal direction of 135° with respect to the edge type 35 of the index 2, and thus a length may be determined as 5.

Also, the number of edge classes is determined as 5 by comparing currently restored pixel values of the currently restored pixel X0 and two neighboring pixels X6 and X7 adjacent to the currently restored pixel X0 in a diagonal direction of 45° with respect to the edge type 36 of the index 3, and thus a length may be determined as 5.

For example, in a case where the edge type is a vertical edge like the edge type 33 of the index 0, and pixel values of the currently restored pixel X0 and two neighboring pixels X1 and X2 horizontally adjacent to the currently restored pixel X0 are compared, the edge class (Class) of the currently restored pixel X0 may be determined according to <process 2> below.

<Process 2>
(1) IF(X0>X1 and X0<X2) then Class=2
(2) IF(X0>X1 and X1==X2) or (X0==X1 and X1>X2) then Class=1;
(3) IF(X0==X1 and X1==X2) or (X0==X1 and X1==X2) then Class=0;
(4) IF(X0<X1 and X1==X2) or (X0==X1 and X1<X2) then Class=−1;
(5) IF(X0<X1 and X0<X2) then Class=−2;

According to the <process 2> above, in a case where the currently restored pixel X0 is (1) a local maximum point of an edge, (2) a pixel of a block edge, (3) a pixel other than the edge, (4) a pixel of a concave edge, and (5) a local minimum point of the edge, respectively, a corresponding edge class may be determined. In a case where an edge class value is 0, since an offset value is highly likely to be 0, an edge class of a restored pixel may not be encoded.

Next, an exemplary embodiment of classifying pixels according to pixel value band types by using the SAO according to an exemplary embodiment will now be described.

Pixel values of restored pixels may belong to one of pixel value bands according to an exemplary embodiment. For example, a minimum value Min and a maximum value Max of pixel values may have a total range of $0, \ldots, 2^{\wedge}(p-1)$ according to p-bit sampling. A pixel value range (Min, Max) may be split into a number K of pixel value bands. In a case where $B_k$ denotes a maximum value of a kth pixel value band, the kth pixel value band may be split into $[B_0, B_1-1]$, $[B_1, B_2-1]$, $[B_2, B_3-1]$, ..., $[B_{K-1}, B_K]$. In a case where a pixel value of the currently restored pixel Rec(x, y) belongs to $[B_{K-1}, B_K]$, a current pixel value band may be determined as k.

The pixel value bands may be split into equal types or unequal types. Such pixel value band types may be determined in consideration of the actual minimum value Min and maximum value Max. In this case, a split reference of the pixel value bands may be encoded and transmitted or received and decoded between the video encoding apparatus 10 and the video decoding apparatus 20. In a case where the pixel value bands are split according to a theoretical range $\{0, \ldots, 2^{p-1}\}$ of pixel values, a pixel value band type may be determined without having to be encoded. Such pixel value band type may be defined as an offset type.

A pixel value band to which each pixel value belongs for each restored pixel may be determined from among a plurality of pixel value bands classified according to pixel value band types. Also, an offset value indicating an average of errors between an original pixel and a restored pixel may be determined for each pixel value band.

Therefore, the video encoding apparatus 10 and the video decoding apparatus 20 may encode and transmit and receive a corresponding offset value for each of the pixel value bands classified according to a current pixel value band type, and adjust a restored pixel according to the offset. Also, a length of an offset value may be the same as the number of pixel value bands. The video encoding apparatus 10 may encode the length and transmit the length to the video decoding apparatus 20.

In a case where an offset value used for a predetermined combination of the edge type and the edge class, i.e. an offset value for the kth pixel value band of the current pixel value band type, is previously determined as 0, there is no need to encode and transmit the offset value to the video decoding apparatus 20. In this case, the length for the predetermined combination of the edge type and the edge class may be reduced.

For example, in a case where a pixel value classification type is an 8-bit equal band, pixel values may be split into 32 pixel value bands. More specifically, pixel values may be split into pixel value bands [0, 7], [8, 15], . . . , [240, 247], [248, 255]. In this case, the length is 32.

In a case where the total number of pixel value bands, i.e. length, is the power of 2, an operation amount for classifying pixels according to pixel value band types according to an exemplary embodiment may be minimized.

Therefore, the video encoding apparatus 10 and the video decoding apparatus 20 may classify pixels according to an image characteristic, such as a pixel value band type, determine an average error value between pixels having the same characteristic as an offset, and adjust restored pixels according to the offset, thereby minimizing an error between an original image and a restored image.

The video encoding apparatus 10 and the video decoding apparatus 20 according to an exemplary embodiment may determine an offset type and an offset value for each predetermined region. The video encoding apparatus 10 may determine an error between an original pixel value and a restored pixel value for each pixel included in predetermined regions, and determine an average of pixel errors as an offset value. For prompt operation, the video encoding apparatus 10 and the video decoding apparatus 20 may determine and transmit or receive an offset value for each block.

The offset type may be determined according to an image characteristic of each block. For example, a block including a vertical edge, a horizontal edge, a diagonal edge, etc. is preferable to classify pixel values according to edge types and determine an offset value for correction of an edge value. In a case where a block is not an edge block, the offset value may be preferably determined according to band classification. Thus, the video encoding apparatus 10 and the video decoding apparatus 20 may transmit or receive the offset type for each block.

An offset parameter according to an exemplary embodiment may include an offset type, offset values, length, and an offset class. The length may be determined according to offset types.

The video encoding apparatus 10 and the video decoding apparatus 20 according to an exemplary embodiment may determine the offset class corresponding to the offset type.

Therefore, the video encoding apparatus 10 according to an exemplary embodiment may encode and transmit the offset type and offset values of the offset parameter to the video decoding apparatus 20. The video decoding apparatus 20 may receive the offset type and offset values and determine the length and the offset class based on the offset type. Also, the video decoding apparatus 20 may select an offset value corresponding to the length or the offset class from the received offset values and adjust restored pixels according to the offset value.

The video encoding apparatus 10 according to an exemplary embodiment may determine an index of an offset type according to a hit ratio of appearance of the offset type to encode the offset type. For example, the higher the hit ratio of appearance of the offset type of the index among offset types, the shorter the codeword of the index may be encoded.

The video encoding apparatus 10 and the video decoding apparatus 20 may have the following examples of indices of the offset type selectable from among offset types including pixel classification according to the edge type and the pixel value band type:

(i) In a case where SAO is not used, an offset type is −1;
(ii) In a case of an edge type including three pixels in a vertical direction, an offset type is 0;
(iii) In a case of an edge type including three pixels in a horizontal direction, an offset type is 1;
(iv) In a case of an edge type including three pixels in a diagonal direction of 135°, an offset type is 2;
(v) In a case of an edge type including three pixels in a diagonal direction of 45°, an offset type is 3;
(vi) An offset type of a pixel value band type is 4.

In the case where (ii) the offset type is 0, an edge class may be encoded to {−2, −1, 1, 2}. The edge class 0 may not be encoded, and thus a length may be 4. In the case where (vi) the offset type is 4, and the number of pixel value bands is 32, a length may be 32.

Figure 4:
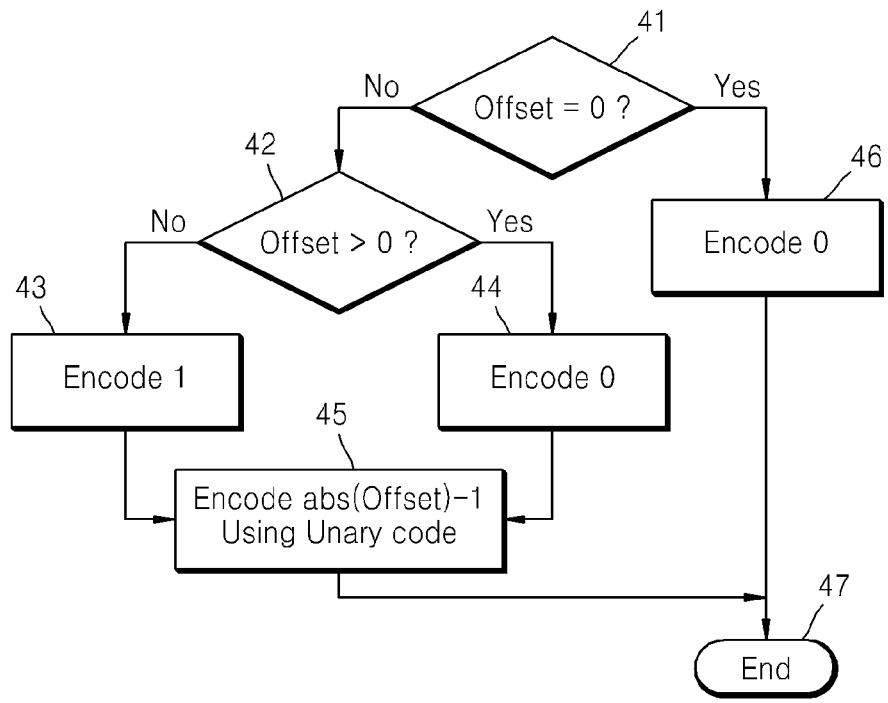
FIG. 4 is a flowchart illustrating an offset value encoding process, according to an exemplary embodiment.

FIG. 4 is a flowchart illustrating an offset value encoding process, according to an exemplary embodiment.

An offset value that is to be encoded and decoded is highly likely to be 0 for transmitting and receiving between the video encoding apparatus 10 and the video decoding apparatus 20 according to an exemplary embodiment. An offset value other than 0 has a positive or negative sign. Thus, the video encoding apparatus 10 according to an exemplary embodiment determines whether a current offset value is 0 (operation 41), and, if the current offset value is not 0, determines whether the current offset value is greater than 0 (operation 42). If the current offset value is greater than 0, a sign bit "0" is encoded (operation 44). If the current offset value is not greater than 0, a sign bit "1" is encoded (operation 43). After the sign bit is encoded, a bit rate generated by performing unary binary-coding on a value obtained by reducing an absolute value of the offset value by 1 may be further encoded (operation 45). The video encoding apparatus 10 may finally encode the current offset value "0" if the current offset value is "0" (operation 46), and completely encode the offset value.

The video decoding apparatus 20 may receive the offset value, determine whether the offset value is 0, and if the offset value is not 0, parse the sign bit and a value obtained by reducing the absolute value of the offset value by 1, and restore the current offset value.

An offset parameter according to an exemplary embodiment may be determined and transmitted and received for each block. For example, the video encoding apparatus 10 and the video decoding apparatus 20 may determine and transmit and receive the offset parameter for each picture or each slice. Alternatively, the video encoding apparatus 10 and the video decoding apparatus 20 may determine and transmit and receive the offset parameter for each encoding unit or a maximum encoding unit of a tree structure. Video encoding/decoding operations based on encoding units of the tree structure including the maximum encoding unit and encoding units of the tree structure according to an exemplary embodiment will be described in more detail with reference to FIGS. 8 to 20.

An offset type and/or an offset value of each block is highly likely to be identical between adjacent blocks. In a case where an offset parameter of a current block is compared to offset parameters of neighboring blocks and is identical thereto, the video encoding apparatus 10 according to an exemplary embodiment may merge and encode the offset parameters of the current block and neighboring blocks into one offset parameter. If the offset parameters of the neighboring blocks are first encoded, the offset parameter of the current block may not be encoded, but offset merge information of the current block may be encoded.

The video decoding apparatus 20 according to an exemplary embodiment may first parse the offset merge information and determine whether the offset parameter is parsed before parsing the offset parameter from a received bitstream. The video decoding apparatus 20 may determine whether there is a block having the same offset parameter as the current block in the offset parameters of the neighboring blocks based on the offset merge information of the current block.

For example, if it is determined that there is the block having the same offset parameter as the current block in the offset parameters of the neighboring blocks based on the offset merge information of the current block, the video decoding apparatus 20 may not parse the offset parameter of the current block but may restore the offset parameter of the current block as same as a restored offset parameter of the neighboring block. Also, a neighboring block having an offset parameter that is to be referred to may be determined from among the neighboring blocks based on the offset merge information.

For example, in a case where the offset parameters of the neighboring blocks are different from the offset parameter of the current block based on the offset merge information, the video decoding apparatus 20 may parse and restore the offset parameter of the current block from the bitstream.

Figure 5:
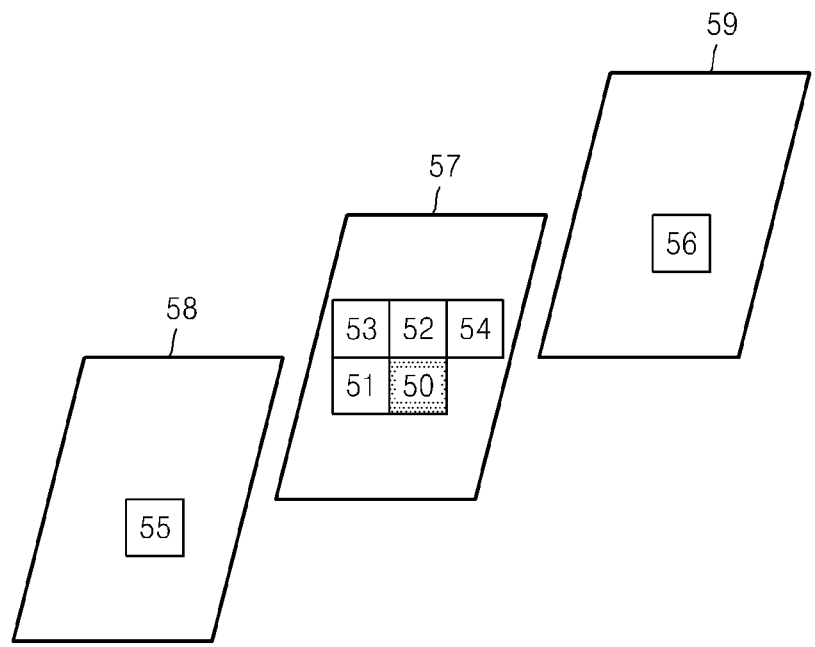
FIG. 5 is a diagram of candidate reference blocks used to merge offset parameters, according to an exemplary embodiment.

FIG. 5 is a diagram of candidate reference blocks used to merge offset parameters, according to an exemplary embodiment.

The video encoding apparatus 10 according to an exemplary embodiment may determine a candidate list of neighboring blocks that are reference targets of offset parameters of a current block 50 from among neighboring blocks restored prior to the current block. The video encoding apparatus 10 may compare the neighboring blocks of the candidate list with the offset parameters of the current block 50.

The candidate list according to an exemplary embodiment may include neighboring blocks disposed in a current frame 57 that is identical to the current block 50. More specifically, a left block 51, an upper block 52, a left upper block 53, and a right upper block 54 may be included in the candidate list.

The video encoding apparatus 10 according to another exemplary embodiment may refer to offset parameters of blocks 55 and 56 included in neighboring frames 58 and 59 restored prior to the current frame 57. The blocks 55 and 59 included in the neighboring frames 58 and 59 may be blocks temporally disposed in previous and subsequent frames 58 and 59 of the current frame 57 and spatially in the same region as the current block 50. In this case, the candidate list may include neighboring blocks 51, 52, 53, and 54 included in the current frame 57 and the blocks 55 and 59 included in the neighboring frames 58 and 59.

Therefore, the video encoding apparatus 10 according to an exemplary embodiment may compare offset parameters of the neighboring blocks included in the candidate list with the offset parameters of the current block 50 according to a predetermined reference sequence. For example, the offset parameters of the neighboring blocks may be compared with the offset parameters of the current block 50 according to the reference sequence of the left block 51, the upper block 52, the left upper block 53, the right upper block 54, a previous block 55, and a subsequent block 56. A neighboring block having the same offset parameter as the current block 50 from among the compared neighboring blocks may be determined as a reference block.

The video encoding apparatus 10 and the video decoding apparatus 20 may predict and refer to, and encode and transmit, or receive and decode, offset parameters between adjacent blocks based on the same candidate list. The video decoding apparatus 20 according to an exemplary embodiment may determine a neighboring block having the same offset parameter as the current block 50 from the candidate list based on offset merge information, and refer to an offset parameter of the corresponding neighboring block to restore the offset parameter of the current block 50 having the same value as the offset parameter of the corresponding neighboring block.

For example, a candidate list including the left block 51 and the upper block 52 is assumed to be used. The offset parameter encoding unit 14 according to an exemplary embodiment may encode, as the offset merge information, left offset merge information indicating whether an offset parameter of the left block 51 is identical to the offset parameter of the current block 50 and upper offset merge information indicating whether an offset parameter of the upper block 52 is identical to the offset parameter of the current block 50. In this case, the current block 50 may be compared with the left block 51 to determine whether their offset parameters are identical to each other, and then the current block 50 may be compared with the upper block 52 to determine whether their offset parameters are identical to each other. The offset merge information may be determined according to comparison results.

If at least one offset parameter of the left block 51 and the upper block 52 is identical to the offset parameter of the current block 50, the offset parameter encoding unit 14 may encode the corresponding left offset merge information and upper offset merge information, but may not encode the offset parameter of the current block 50.

If the offset parameters of the left block 51 and the upper block 52 are different from the offset parameter of the current block 50, the offset parameter encoding unit 14 may encode the corresponding left offset merge information and upper offset merge information and the offset parameter of the current block 50.

If the offset parameters of the left block 51 and the upper block 52 are different from the offset parameter of the current block 50, the offset parameter encoding unit 14 according to an exemplary embodiment may encode offset merge information and the offset parameter of the current block 50.

As another example, if partial information of the offset parameters of the neighboring blocks is identical to the offset parameter of the current block 50, the offset parameter encoding unit 14 according to an exemplary embodiment may encode offset merge information of one bit and remaining information of a current offset parameter except for the identical partial information of the offset parameters of the neighboring blocks. For example, if the current block 50 and the neighboring blocks are identical to each other in terms of an offset value, the offset merge information of one bit and an offset type value may be encoded for the current block 50.

The video encoding apparatus 10 and the video decoding apparatus 20 according to an exemplary embodiment may compare offset types and offset values between the current block 50 and the neighboring blocks, and, if there is a neighboring bock having the same offset type and offset value as the current block 50, may transmit and receive the offset merge information.

As another example, offset types are compared among the offset parameters of the current block 50 and the neighboring blocks, and, if there is a neighboring block having the same offset type as the current block 50, merge information of an offset type of the corresponding neighboring block may be transmitted and received.

As another example, offset values are compared among the offset parameters of the current block 50 and the neighboring blocks, and, if there is a neighboring block having the same offset value as the current block 50, merge information of an offset value of the corresponding neighboring block may be transmitted and received.

If adjacent blocks are identical in terms of length although offset types are different between the adjacent blocks, offset values of the adjacent blocks may be similar. For example, the adjacent blocks are highly likely to constitute the same object region among objects indicated by an image. Thus, although an edge type of the current block 50 that is a vertical edge is different from an edge type of a neighboring block that is a diagonal edge, pixels of the current block 50 and the neighboring block may constitute the same object region. Thus, an offset value of the current block 50 and an offset value of the neighboring block may tend to be similar. Accordingly, a candidate list of neighboring blocks for the current block 50 may include neighboring blocks only having the same length of the edge type.

The video encoding apparatus 10 and the video decoding apparatus 20 according to an exemplary embodiment may predict the offset parameter of the current block 50 by referring to offset parameters of neighboring bocks between blocks having the same length.

In a case where prediction encoding is performed on an offset parameter, the video encoding apparatus 10 and the video decoding apparatus 20 may signal a prediction candidate list including neighboring blocks that may be referred to perform prediction encoding on the offset parameter. Alternatively, an offset parameter of a block that is most adjacent to the current block 50 is always referred to, and thus the most adjacent block included in the prediction candidate list may not be transmitted nor received.

The prediction candidate list including the most adjacent block of the current block 50 according to an exemplary embodiment may (i) include candidate blocks arranged in a reference sequence (ii) among candidate blocks that are restored prior to the current block 50 and have the same length, (iii) except for candidate blocks having the same offset parameter. A first rank candidate block of the prediction candidate list may be the most adjacent block. For example, if the prediction candidate list includes the left block 51 and the upper block 52 disposed at the same distance from the current bock 50, the left block 51 having a smaller operation amount necessary to access from the current bock 50 than the upper block 52 may be the most adjacent block.

After the prediction candidate list is determined, prediction encoding may be performed on offset values of the current block 50 by referring to offset values of the most adjacent block. Difference values between offset values of the current block 50 and offset values of the most adjacent bock may be encoded and transmitted or received.

<Offset Prediction Value>

Offset[i]−Offset_prediction[i], 0≤i≤Length−1

That is, according to an <Offset prediction value>, difference values Offset[i]−Offset_prediction[i] between offset values Offset[i] of the current block 50 and offset values Offset_prediction[i] of the most adjacent block may be encoded and transmitted or received for each edge class i (or each pixel value band) between the current block 50 and the most adjacent block having the same length (Length). Whenever the edge class i (or the pixel value band) changes, a prediction differential value with respect to a corresponding edge class (or a corresponding pixel value band) may be transmitted or received.

The video encoding apparatus 10 and the video decoding apparatus 20 according to an exemplary embodiment may limitedly perform merge encoding or prediction encoding on the offset parameter. For example, to encode the offset parameters of the current block 50 according to the pixel value band type, although two neighboring blocks have the same length, i.e. the same number of pixel value bands, maximum and minimum values of the neighboring blocks and maximum and minimum values of the current block 50 are different, and thus if an overall range of pixel values is different between the neighboring blocks and the current block 50, offset parameters of the neighboring blocks and the offset parameters of the current block 50 have no relation according to the pixel value band type. Therefore, if the neighboring blocks and the current block 50 are different in terms of a characteristic of the offset type, the video encoding apparatus 10 and the video decoding apparatus 20 are not preferable to merge and perform prediction encoding on offset parameters between adjacent blocks.

The video encoding apparatus 10 and the video decoding apparatus 20 according to an exemplary embodiment may perform prediction encoding on offset parameters for each color component.

For example, an SAO may be applied to both a luma block and chroma blocks of a YUV color format. An offset type and/or offset values of the luma block of a Y component may be quite similar to offset types and/or offset values of the chroma blocks of U and V components.

For example, the video encoding apparatus 10 and the video decoding apparatus 20 adds a luma block at the same location as a current chroma block to a candidate list of the current chroma block, and thus an offset parameter of the current chroma block may be predicted by referring to an offset parameter of the luma block. The highest priority may be allocated to a luma block from among a reference list of blocks included in the candidate list.

As another example, the video encoding apparatus 10 and the video decoding apparatus 20 may encode offset parameters based on predetermined relations between the offset parameters of the luma component and the chroma components. In general, the chroma blocks are flatter than the luma block, and absolute values of offset values according to maximum and minimum values, edge classes, and pixel values bands of the chroma blocks are smaller than those of the luma block.

A <chroma offset prediction equation> below explains an exemplary embodiment of performing prediction encoding of offset values of the chroma blocks in a case where the offset values of the chroma blocks are determined based on an offset value of the luma block.

Value_to_be_encoded[$i$]=Offset[$i$]−$F$(Offset_prediction[$i$]); <Chroma Offset Prediction Equation> wherein $F(x)=A*x+B$;

In this regard, i denotes a current edge class (a pixel value band) within a length range, and an error value Value_to_be_encoded[i] between a prediction value F(Offset_prediction[i]) and the offset values Offset[i] of the chroma blocks determined based on the offset value Offset_prediction[i]) of the luma block to which the chroma blocks refer may be transmitted or received between the video encoding apparatus 10 and the video decoding apparatus 20.

In F(x), A and B denote correlation parameters between the luma block and the chroma blocks. The correlation parameters A and B may be separately set for the U component and the Y component. Alternatively, the U component and the Y component may share the correlation parameters A and B.

The video encoding apparatus 10 and the video decoding apparatus 20 according to an exemplary embodiment may encode and transmit or receive and decode the correlation parameters A and B, to perform prediction encoding on offset values between the luma block and the chroma blocks based on correlations between the color components. The correlation parameters A and B may be previously fixed as predetermined values according to an exemplary embodiment. The correlation parameters A and B according to an exemplary embodiment may be determined for each predetermined data unit such as a block, a picture, a slice, a video sequence, etc. and may be transmitted or received after being included in parameters for each block, a picture parameter set (PPS), a slice header, and a sequence parameter set (SPS).

Figure 6:
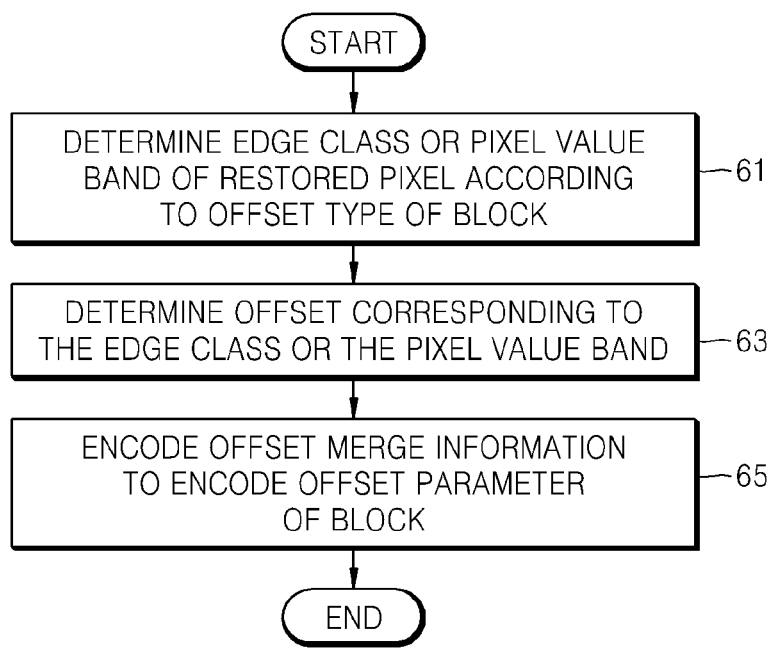
FIG. 6 is a flowchart illustrating a video encoding method, according to an exemplary embodiment.

FIG. 6 is a flowchart illustrating a video encoding method, according to an exemplary embodiment.

In operation 61, an edge class according to an edge type of a current block from among blocks of video may be determined or a pixel value band according to a pixel value band type may be determined.

In a case where an offset of the current block is determined according to the edge type, the edge class indicating whether a currently restored pixel is an extreme point from among neighboring pixels of the currently restored pixel disposed according to an edge direction and edge size may be determined by comparing pixel values of the currently restored pixel and the neighboring pixels.

Also, in a case where the offset of the current block is determined according to pixel value band types of restored pixels, the pixel value band indicating a pixel value range to which the pixel value of the currently restored pixel belongs may be determined from among a plurality of bands.

In operation 63, an offset corresponding to a current edge class or pixel value band is determined by using difference values between restored pixels and original pixels included in the edge class or the pixel value band. An average value of difference values between restored pixels and original pixels included in the same edge class or the same pixel value band may be determined as an offset value.

In operation 65, an offset parameter of each block is encoded. The offset parameter may include an offset type of a corresponding block, an offset value thereof, length thereof, and an edge class and pixel value band thereof.

The offset type of each block indicates an edge type or pixel value band type of a corresponding block. Restored pixels of each block are classified into a plurality of edge classes according to the edge type of each block, and each offset value is determined for each edge class, and thus a plurality of offset values corresponding to the plurality of edge classes are determined. Alternatively, restored pixels of each block are classified into a plurality of pixel value bands according to the edge type of each block, and each offset value is determined for each pixel value band, and thus a plurality of offset values corresponding to the plurality of pixel value bands are determined. The length is determined according to the edge type of each block or pixel value band thereof. Thus, only the offset type and offset values among the offset parameters of each block may be encoded.

Offset merge information of the current block may be encoded based on identities between offset parameters of the current block and at least one neighboring block. The offset merge information may indicate whether an offset parameter of the current block is encoded. That is, if neighboring blocks include a block having the same offset parameter as that of the current block, only the offset merge information of the current block may be encoded, and the offset parameter thereof may not be encoded.

Differential information between offset parameters of neighboring blocks and the offset parameter of the current block may be encoded by performing prediction on the offset parameters of neighboring blocks and the offset parameter of the current block. Prediction encoding may be performed on at least one color component among a luma block and chroma blocks of the current block by referring to each other's offset parameters.

Figure 7:
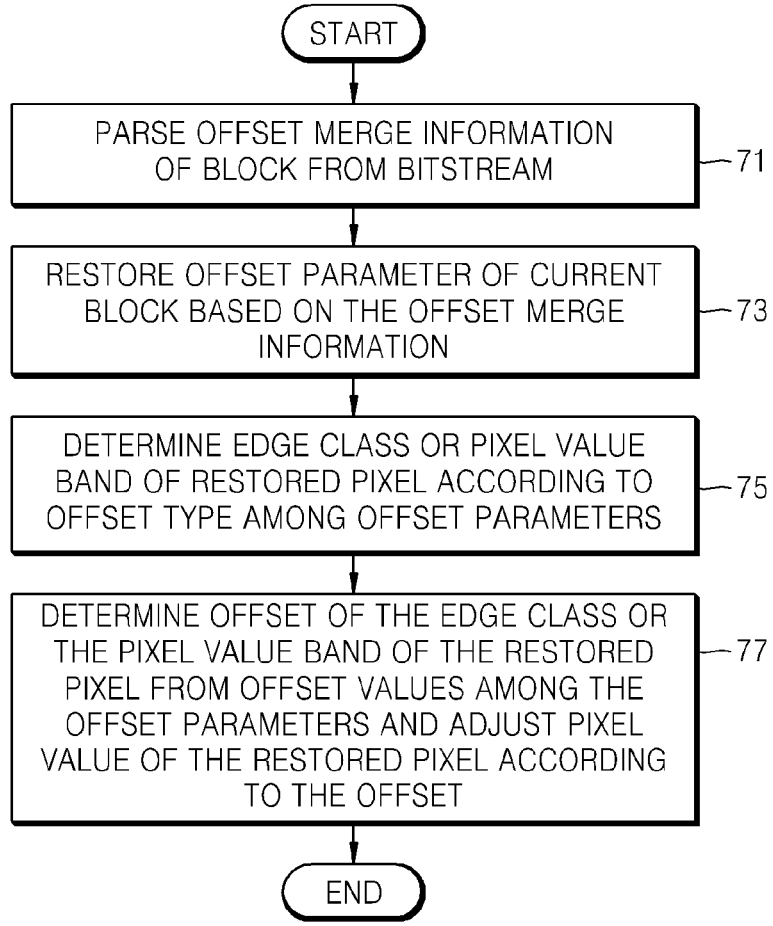
FIG. 7 is a flowchart illustrating a video decoding method, according to an exemplary embodiment.

FIG. 7 is a flowchart illustrating a video decoding method, according to an exemplary embodiment.

In operation 71, offset merge information indicating whether offset parameters of a current block and at least one neighboring block from among blocks of video are identical to each other is parsed from a received bitstream.

In operation 73, offset types and offset values among the offset parameters of the current block are restored based on the offset merge information.

In operation 75, an edge class of a restored pixel or a pixel value band thereof is determined based on an edge type of the current block or a pixel value band type thereof indicating the offset type.

In operation 77, an offset value corresponding to the edge class of the restored pixel or the pixel value band thereof is determined from the offset values, and a pixel value of the restore pixel is adjusted according to the offset value.

In a case where the offset type of the current block is the edge type in operation 75, an edge class of a currently restored pixel may be determined by comparing pixel values of the currently restored pixel and neighboring pixels of the currently restored pixel disposed according to an edge direction and edge size. In this case, in operation 77, an offset corresponding to the edge class of the currently restored pixel may be selected from received offset values.

Also, in a case where the offset type of the current block is the pixel value band type in operation 75, a pixel value band of the currently restored pixel may be determined, and in operation 77, an offset corresponding to the pixel value band of the currently restored pixel may be selected from offset values.

If at least one offset parameter of a left block and an upper block of the current block is identical to the offset parameter of the current block based on the offset merge information in operation 71, the offset parameter of the current block may be restored as same as the at least one offset parameter of the left block and the upper block of the current block. Also, if the at least one offset parameter of the left block and the upper block of the current block is different from the offset parameter of the current block based on the offset merge information, the offset parameter of the current block may be parsed from the received bitstream and may be restored.

If differential values of the offset values are parsed from the bitstream in operation 71, prediction restoration may be performed on the offset values of the current bock by combining differential information between offset values and offset information of neighboring blocks.

Prediction restoration may be performed on at least one color component among the luma component and the chroma components of the current block by referring to each other's offset parameters in operation 71.

Therefore, the video encoding apparatus 10 and the video decoding apparatus 20 using the SAO according to an exemplary embodiment classify pixel values according to an image characteristic such as edge types of image blocks or pixel value band types thereof, encode and transmit or receive and decode an offset value that is an average error value between pixel values classified having the same characteristic, and adjust pixel values that are not expected among restored pixels according to the offset value, thereby minimizing an error between an original image and a restored image.

The video encoding apparatus 10 and the video decoding apparatus 20 according to an exemplary embodiment may split blocks that are split from video data into encoding units of a tree structure, and determine an offset set according to pixel classification for each maximum encoding unit or each coding unit as described above. A video encoding method and apparatus and a video decoding method and apparatus based on coding units and transformation units having a tree structure according to an exemplary embodiment will be described with reference to FIGS. 7 to 20 below.

Figure 8:
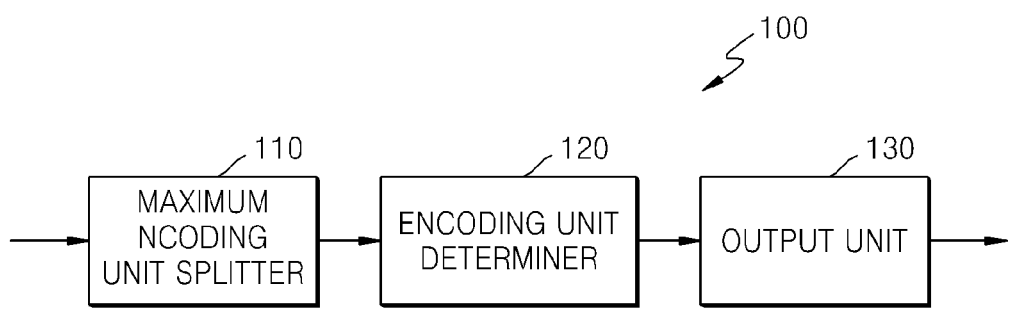
FIG. 8 is a block diagram of a video encoding apparatus based on coding units having a tree structure, according to an exemplary embodiment.

FIG. 8 is a block diagram of a video encoding apparatus 100 based on coding units having a tree structure, according to an exemplary embodiment.

The video encoding apparatus 100 involving video prediction based on coding units having the tree structure according to an exemplary embodiment includes a maximum coding unit splitter 110, a coding unit determiner 120, and an output unit 130. For convenience of description, the video encoding apparatus 100 involving video prediction based on coding units having the tree structure according to an exemplary embodiment will hereinafter be referred to as the "video encoding apparatus 100".

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. To encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit to perform the prediction encoding on the image data in the coding unit.

To perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. The partition is a data unit split from the prediction unit of the coding unit, and the prediction unit may be a partition having the same size as the coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

To perform the transformation in the coding unit, the transformation may be performed based on a data unit having a size smaller than or equal to the coding unit. For example, the data unit may include a data unit for an intra mode and a transformation unit for an inter mode.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into 4^1 transformation units, and the size of the transformation unit is thus N×N, and may be 2 when each of the height and width of the current coding unit is split into four equal parts, totally split into 4^2 transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

A method of determining a coding unit according to a tree structure in a maximum coding unit, a prediction unit, a partition, and a transformation unit according to exemplary embodiments, will be described in detail later with reference to FIGS. 7 through 19.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream, a sequence parameter set, or a picture parameter set.

Also, information regarding a maximum size of a transformation unit allowed with respect to current video and information regarding a minimum size of the transformation unit may be output through the header of the bitstream, the sequence parameter set, or the picture parameter set. The output unit 130 may encode and output reference information, bidirectional prediction information, slice type information including a fourth slice type, etc. relating to the prediction described with reference to FIGS. 1 through 6.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The video encoding apparatus 100 of FIG. 8 may perform an operation of the video encoding apparatus 10 described above with reference to FIG. 1.

The coding unit determiner 120 may perform an operation of the offset determining unit 12 of the video encoding apparatus 10. The coding unit determiner 120 may determine an offset value for each edge class by classifying pixel values according to edge types for each maximum coding unit or determine an offset value for each pixel value band by classifying pixel values according to pixel value band types. The offset value of each pixel group such as the edge class or the pixel value band may be an average error value between restored pixels and original pixels included in a corresponding pixel group. As another example, the edge class and the offset value or the pixel value band and the offset value may be determined for each predetermined data unit such as a coding unit, a prediction unit, and a transformation unit.

The output unit 130 may encode the offset type and offset values among offset parameters determined for each maximum coding unit. In a case where the offset parameter is determined for each predetermined data unit such as the coding unit, the prediction unit, and the transformation unit, the offset type and offset values may be encoded as parameters of a corresponding data unit.

The output unit 130 may perform prediction encoding on a current offset parameter of a current maximum coding unit by referring to neighboring offset parameters of neighboring maximum coding units. The output unit 130 may encode offset merge information for the current maximum coding unit without encoding the current offset parameter if at least one of the neighboring offset parameters is identical to the current offset parameter. The output unit 130 may encode the offset merge information and the current offset parameter for the current maximum coding unit if the neighboring offset parameters and the current offset parameter are different from each other.

Figure 9:
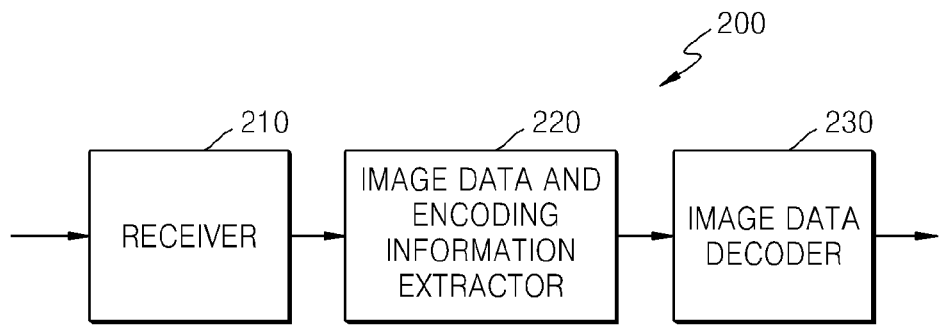
FIG. 9 is a block diagram of a video decoding apparatus based on coding units having a tree structure, according to an exemplary embodiment.

FIG. 9 is a block diagram of a video decoding apparatus 200 based on coding units having a tree structure, according to an exemplary embodiment.

The video decoding apparatus 200 involving video prediction based on coding units having the tree structure according to an exemplary embodiment includes a receiver 210, an image data and encoding information extractor 220, and an image data decoder 230. For convenience of description, the video decoding apparatus 200 involving video prediction based on coding units having the tree structure according to an exemplary embodiment will hereinafter be referred to as the "video decoding apparatus 200".

Definitions of various terms, such as a coding unit, a depth, a prediction unit, a transformation unit, and information about various encoding modes, for various operations of the video decoding apparatus 200 are identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. Decoding in the current decoding unit may be performed by obtaining information regarding the coding mode for the coding unit determined as described above.

Also, the video decoding apparatus 200 of FIG. 9 may perform an operation of the video decoding apparatus 20 described above with reference to FIG. 2.

The receiver 210 and the image data and encoding information extractor 220 may perform an operation of the offset parameter parsing unit 22 of the video decoding apparatus 20. The image data decoder 230 may perform an operation of the offset adjusting unit 24 of the video decoding apparatus 20.

The image data and encoding information extractor 220 may restore a current offset parameter as same as at least one of neighboring offset parameters in a case where offset merge information is only parsed from a bitstream without an offset parameter for a current maximum coding unit. A parameter that is to be referred to from among the neighboring offset parameters may be determined based on the offset merge information. The image data and encoding information extractor 220 may parse and restore the current offset parameter for the current maximum coding unit from the bitstream if the neighboring offset parameters and the current offset parameter are determined to be different from each other based on the offset merge information for the current maximum coding unit parsed from the bitstream.

The image data and encoding information extractor 220 may perform prediction restoration on the current offset parameter in the current maximum coding unit by referring to the neighboring offset parameters of neighboring maximum coding units.

The image data decoder 230 may parse an offset parameter for each maximum coding unit from the bitstream. It may be determined whether an offset type of the current maximum coding unit is an edge type or a pixel value band type from the restored offset parameters. If the offset type of the current maximum coding unit is the edge type, an edge class for each restored pixel may be determined, and an offset value corresponding to the edge class of each restored pixel may be selected from offset values the offset parameters. If the offset type of the current maximum coding unit is the pixel value band type, each pixel value band for each restored pixel may be determined, and an offset value corresponding to the pixel value band of each restored pixel may be selected from offset values parsed and included in the offset parameters.

The image data decoder 230 may generate a restored pixel having a minimum error with respect to an original pixel by adjusting a corresponding restored pixel value by an offset value corresponding to each restored pixel. As another example, in a case where the offset parameter is parsed for each predetermined data unit such as a coding unit, a prediction unit, and a transformation unit, an offset value corresponding to each edge class may be restored for each corresponding data unit or an offset value corresponding to each pixel value band may be restored.

In conclusion, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 10:
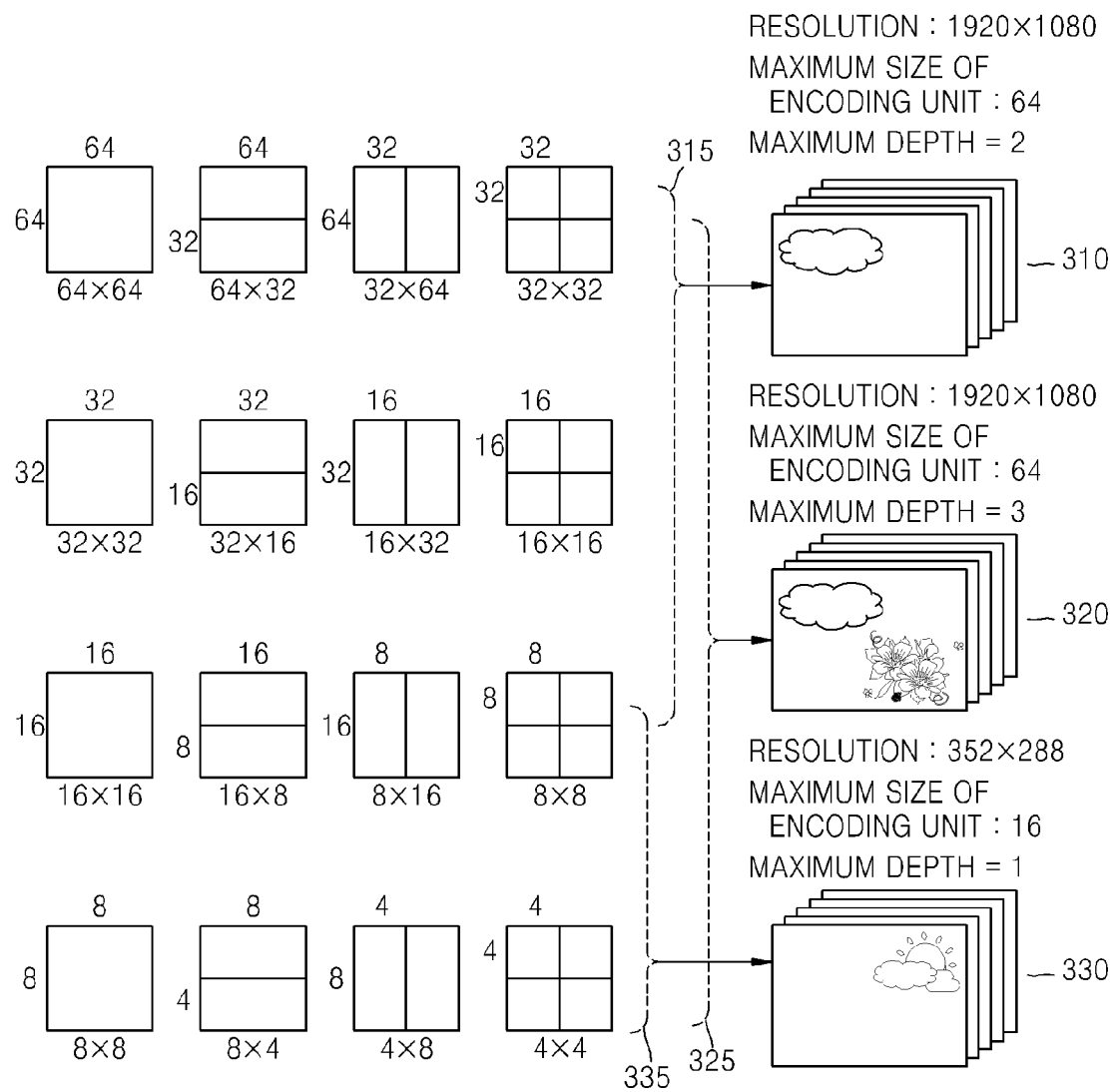
FIG. 10 is a diagram for describing a concept of coding units according to an exemplary embodiment.

FIG. 10 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a maximum coding unit to a minimum coding unit.

If a resolution is high or a data amount is large, a maximum size of a coding unit may be large to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 11:
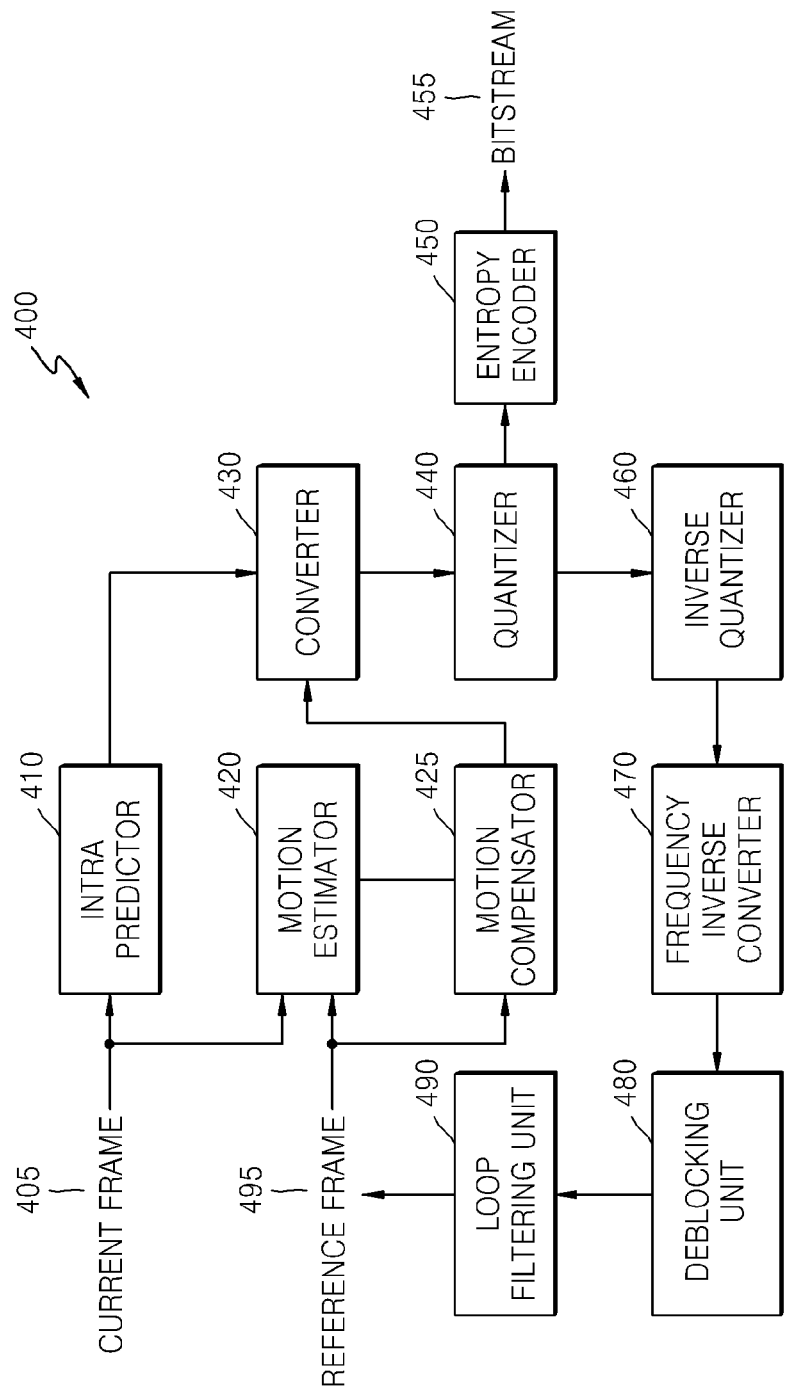
FIG. 11 is a block diagram of an image encoder based on coding units according to an exemplary embodiment.

FIG. 11 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

For the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

The image encoder 400 may classify pixels according to an edge type (or a pixel value band) for each maximum coding unit of the reference frame 495, determine an edge class (or a pixel value band) for each restored pixel, and determine an average error value of restored pixels that belong to each edge class (or each pixel value band). Offset types and offset values for each maximum coding unit may be encoded and transmitted or received and decoded.

Figure 12:
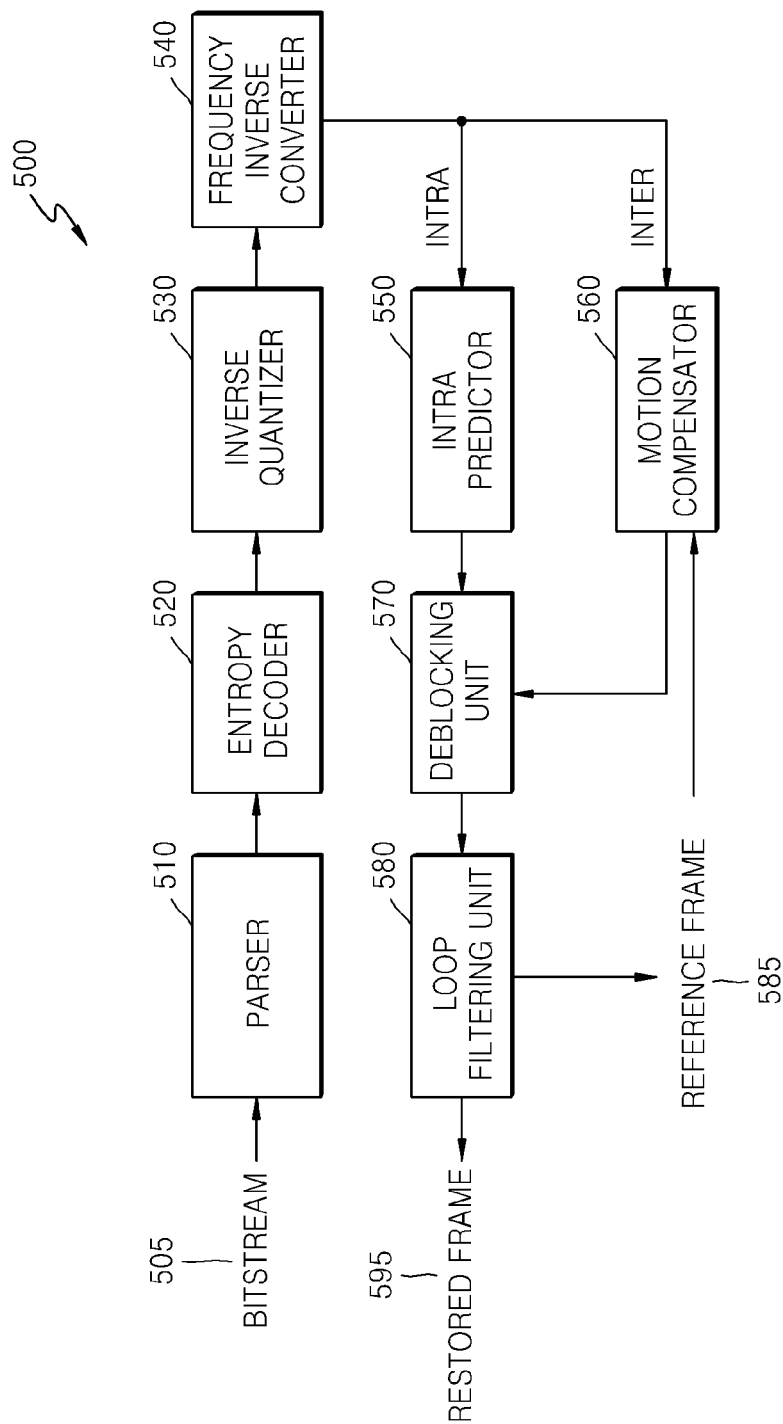
FIG. 12 is a block diagram of an image decoder based on coding units according to an exemplary embodiment.

FIG. 12 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

To decode the image data in the image data decoder 230 of the video decoding apparatus 200, the image decoder 500 may perform operations that are performed after the parser 510.

For the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

The image decoder 500 may extract offset parameters of maximum coding units from a bitstream, and adjust each restored pixel for each maximum coding unit of the restored frame 595 by an offset value corresponding to a corresponding edge class or pixel value band by using offset types and offset values included in the offset parameters.

Figure 13:
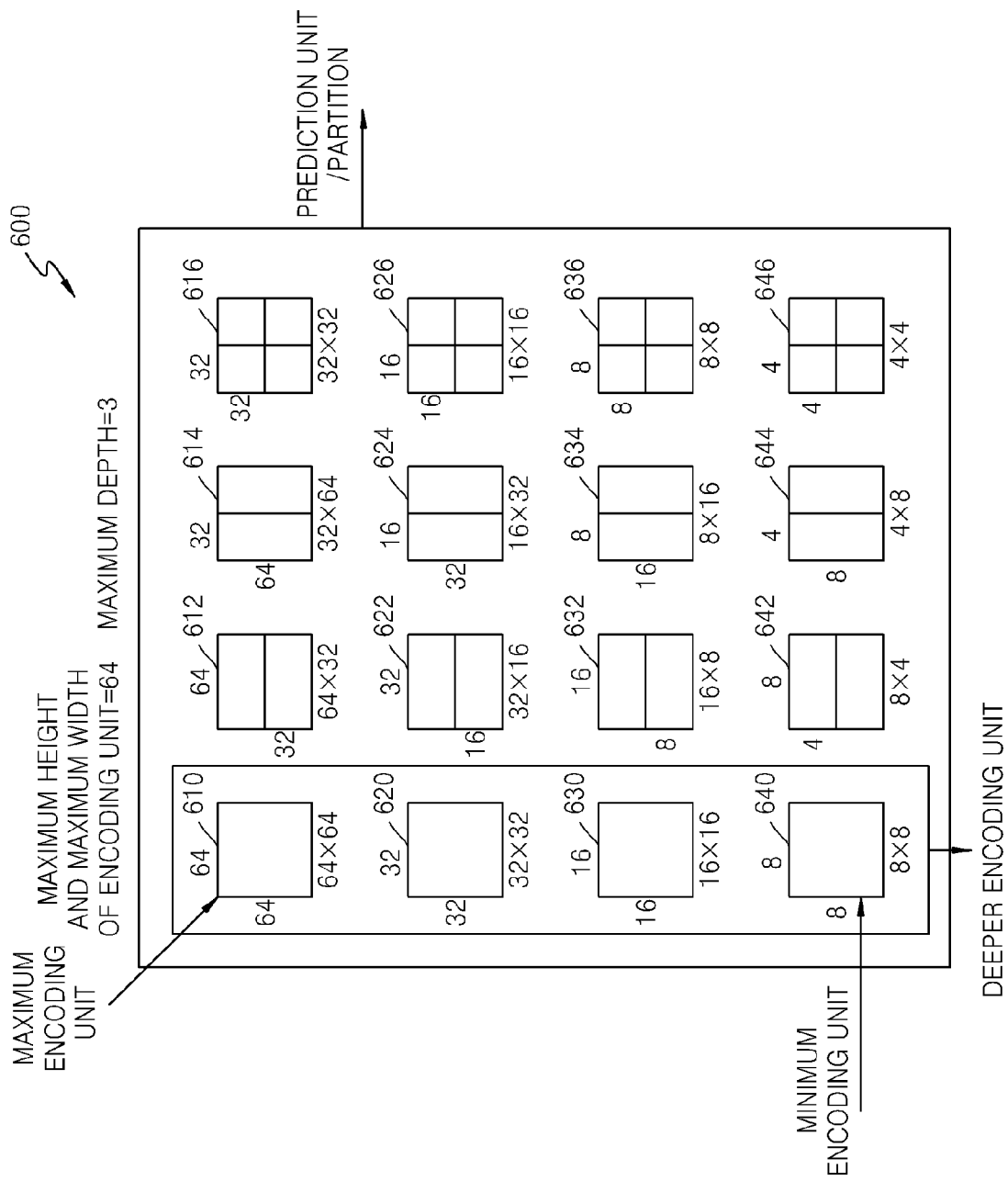
FIG. 13 is a diagram illustrating deeper coding units according to depths, and partitions according to an exemplary embodiment.

FIG. 13 is a diagram illustrating deeper coding units according to depths, and partitions, according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

To determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1.

Accordingly, to compare encoding results of the same data according to depths, the coding unit corresponding to the depth of 1 and four coding units corresponding to the depth of 2 are each encoded.

To perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 14 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 15 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

Figure 16:
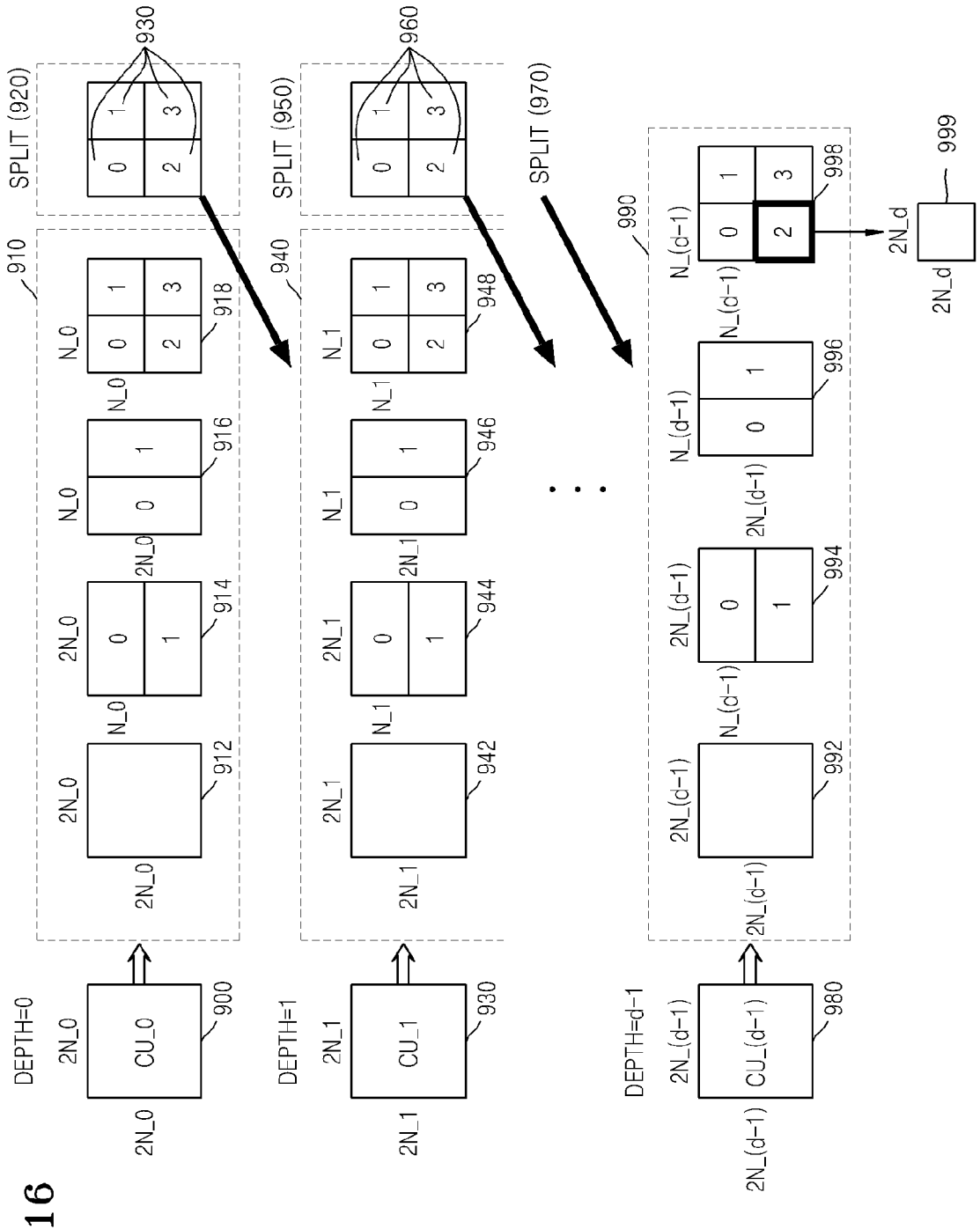
FIG. 16 is a diagram of deeper coding units according to depths, according to an exemplary embodiment.

The image data and encoding information extractor 220 of the video decoding apparatus 200 may extract and use the information 800, 810, and 820 for decoding, according to each deeper coding unit FIG. 16 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 16 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 17:
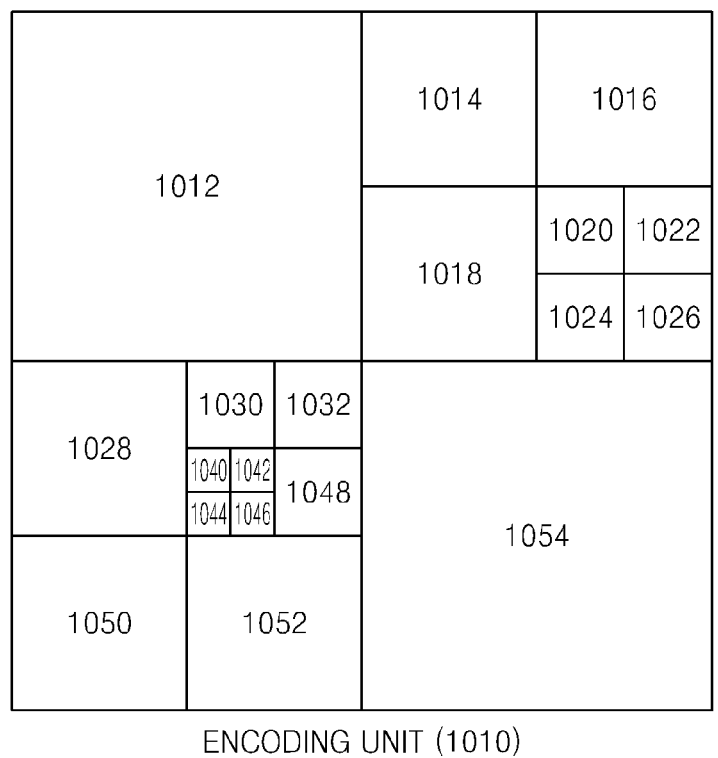
FIGS. 17 through 19 are diagrams for describing a relationship between coding units, prediction units, and transformation units, according to an exemplary embodiment.
Figure 18:
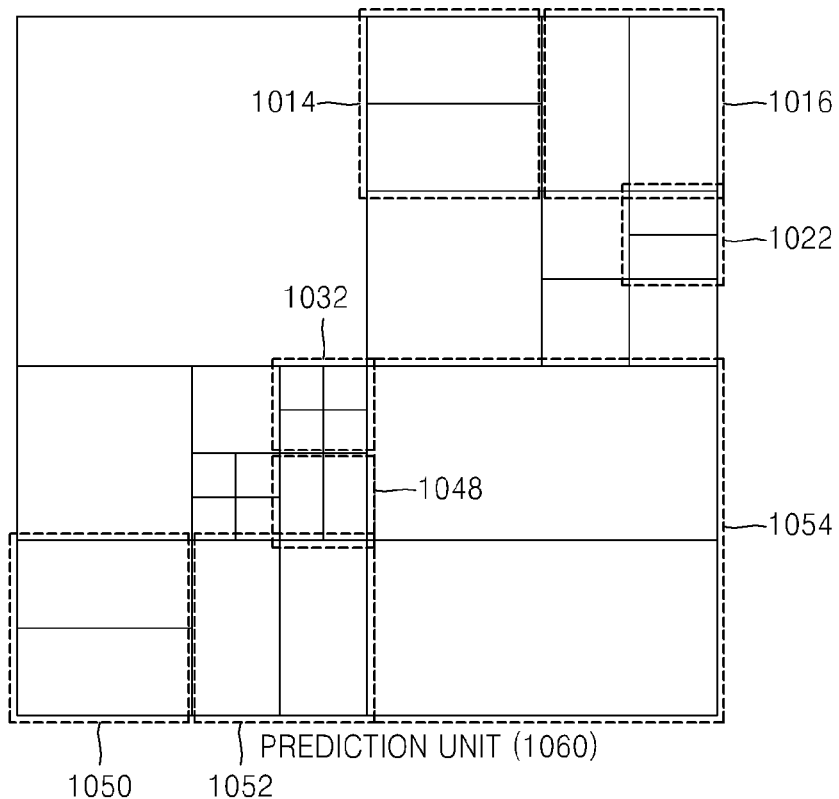
Figure 19:
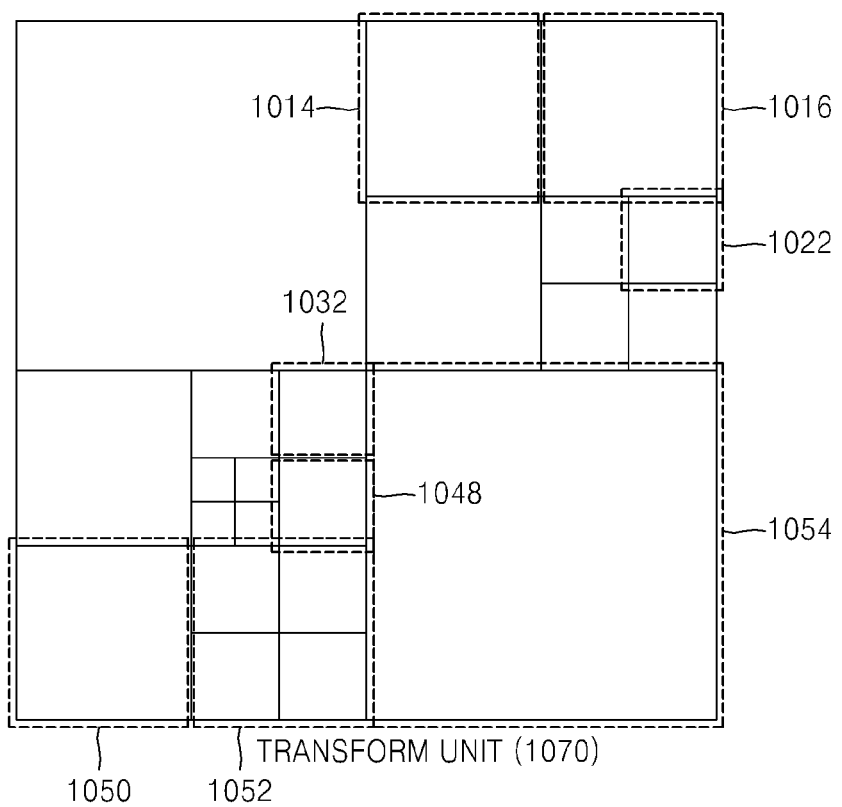

FIGS. 17 through 19 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
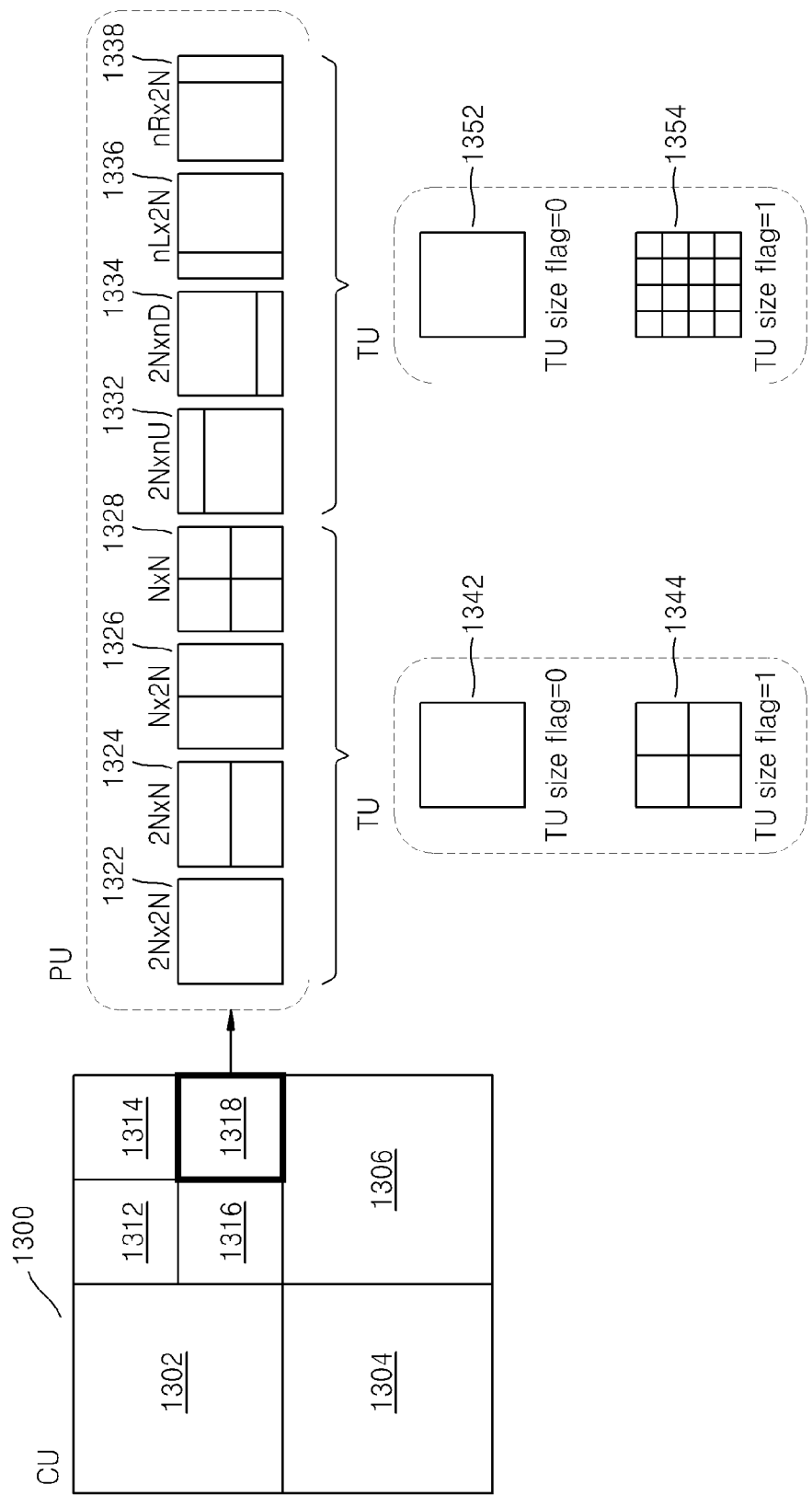
FIG. 20 is a diagram for describing a relationship between a coding unit, a prediction unit or a partition, and a transformation unit, according to encoding mode information of Table 1.

FIG. 20 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a kind of transformation index. A size of the transformation unit corresponding to the transformation index may change according to a prediction unit type or a partition type of a coding unit.

When the partition type is set to be symmetrical, i.e. the partition type 1322, 1324, 1326, or 1328, a transformation unit 1342 having a size of 2N×2N is set if the split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value or 0 or 1, but the TU size flag is not limited to 1 bit, and a transformation unit may be hierarchically split having a tree structure while the TU size flag increases from 0. The split information (TU size flag) of a transformation unit may be used as an exemplary embodiment of the transformation index.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize=max(MinTransformSize,RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=min(MaxTransformSize,PUSize) \quad (2)$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=min(MaxTransformSize,PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

According to the video encoding method based on coding units of the tree structure described above with reference to FIGS. 8 through 20, image data of a spatial domain may be encoded for each coding unit of the tree structure, and image data of the spatial domain may be restored when decoding is performed for each maximum coding unit according to the video decoding method based on coding units of the tree structure, and thus video that includes a picture and a picture sequence may be restored. The restored video may be reproduced by a reproduction apparatus, stored in a storage medium, or transmitted over a network.

Also, an offset parameter may be encoded and transmitted or received and decoded for each picture, each slice, or each maximum coding unit, or for each coding unit of the tree structure, or a prediction unit of a coding unit, or a transformation unit of the coding unit. For example, restored pixel values of maximum coding units are adjusted by using restored offset values based on an offset parameter received for each maximum coding unit, and thus a restored block having a minimum error with respect to an original block may be restored.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A video decoding method comprising:
   parsing, from a bitstream, offset merge information indicating whether a sample offset parameter of a current block is derived from a sample offset parameter of a neighboring block;
   when the offset merge information indicates that the sample offset parameter of the current block is derived from the sample offset parameter of the neighboring block, determining the sample offset parameter of the current block using the sample offset parameter of the neighboring block;
   when the offset merge information indicates that the sample offset parameter of the current block is not derived from the sample offset parameter of the neighboring block, obtaining, from the bitstream, a plurality of offset values and information about an offset type of the current block; and
   compensating for a sample value of a current sample among samples of the current block, by using an offset value for the current sample among the plurality of offset values of the current block,
   wherein:
   when the information about an offset type indicates an edge offset type, the obtaining a plurality of offset values comprises further obtaining, from the bitstream, information about a particular edge direction of the current block among a plurality of edge directions,
   the plurality of offset values of the current block correspond to a plurality of edge classes,
   two neighboring samples, among samples adjacent to the current sample, are determined corresponding to the particular edge direction of the current block, an edge class for the current sample, among the plurality of edge classes, is determined according to whether the current sample is larger than the two neighboring samples, and the offset value for the current sample is determined, among the plurality of offset values of the current block, according to the edge class for the current sample, and wherein, when the information about an offset type indicates a band offset type, the obtaining a plurality of offset values comprises:

obtaining, from the bitstream, a plurality of absolute values of the offset values; and when the absolute values of the offset values are not zero, obtaining, from the bitstream, a plurality of signs of the offset values.

2. The video decoding method of claim 1, wherein, when the offset merge information indicates that the sample offset parameter of the current block is derived from the sample offset parameter of the neighboring block, the sample offset parameter of the current block is not parsed from the bitstream, and the neighboring block is one of a left block and an upper block of the current block.

3. The video decoding method of claim 1, wherein the information about a particular edge direction of the current block indicates one among 0°, 45°, 90° and 135°.

* * * * *